United States Patent
Sepasi Ahoei et al.

(10) Patent No.: US 11,977,816 B1
(45) Date of Patent: May 7, 2024

(54) TIME-BASED CONTEXT FOR VOICE USER INTERFACE

(71) Applicant: Amazon Technologies, Inc., Seattle, WA (US)

(72) Inventors: Arash Sepasi Ahoei, Irvine, CA (US); Jack Andrew Tomlinson, Ladera Ranch, CA (US); Matthew Brian Urtnowski, Irvine, CA (US); Volkan Aginlar, Rancho Mission Viejo, CA (US); Lei Raymond Lu, Arcadia, CA (US); Song Chen, Irvine, CA (US); Arun Ramaswamy, Tampa, FL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/895,752

(22) Filed: Aug. 25, 2022

(51) Int. Cl.
| | |
|---|---|
| *G06F 3/16* | (2006.01) |
| *G06F 3/04842* | (2022.01) |
| *G06F 40/106* | (2020.01) |
| *G06F 40/134* | (2020.01) |
| *G10L 15/22* | (2006.01) |

(52) U.S. Cl.
CPC .......... *G06F 3/167* (2013.01); *G06F 3/04842* (2013.01); *G06F 40/106* (2020.01); *G06F 40/134* (2020.01); *G10L 15/22* (2013.01); G10L 2015/223 (2013.01)

(58) Field of Classification Search
CPC .... G06F 3/167; G06F 3/04842; G06F 40/106; G06F 40/134; G10L 15/22; G10L 2015/223
See application file for complete search history.

(56) References Cited

U.S. PATENT DOCUMENTS

| | | | |
|---|---|---|---|
| 10,318,236 B1 * | 6/2019 | Pal | G06F 40/56 |
| 2019/0206405 A1 * | 7/2019 | Gillespie | G06Q 30/0201 |
| 2019/0370843 A1 * | 12/2019 | Chen | G06Q 30/0267 |
| 2020/0395016 A1 * | 12/2020 | Kapila | G06Q 30/0621 |
| 2021/0342885 A1 * | 11/2021 | McLeod | H04L 65/612 |
| 2022/0121418 A1 * | 4/2022 | Liu | G10L 15/22 |
| 2022/0222039 A1 * | 7/2022 | Wilberding | H04N 21/4394 |

* cited by examiner

*Primary Examiner* — Sang H Kim
(74) *Attorney, Agent, or Firm* — Pierce Atwood LLP

(57) ABSTRACT

A media marker mechanism may be used to send, to a cloud service, up-to-date context regarding playback of a media content stream on a user device. The cloud service may insert a media content item into a media content stream and/or combine media content items into a media content stream. The cloud service may implement the media marker mechanism to tag a content item with metadata that can be read by the user device. The user device can play the streaming media content and, when the tagged content item plays, read the metadata and send it to the cloud service. The cloud service can use the metadata to enrich the media content delivery by, for example, providing a companion image that the user device can display while paying the tagged content item, providing a link to make the companion image clickable, handling requests referring to the media content, etc.

20 Claims, 17 Drawing Sheets

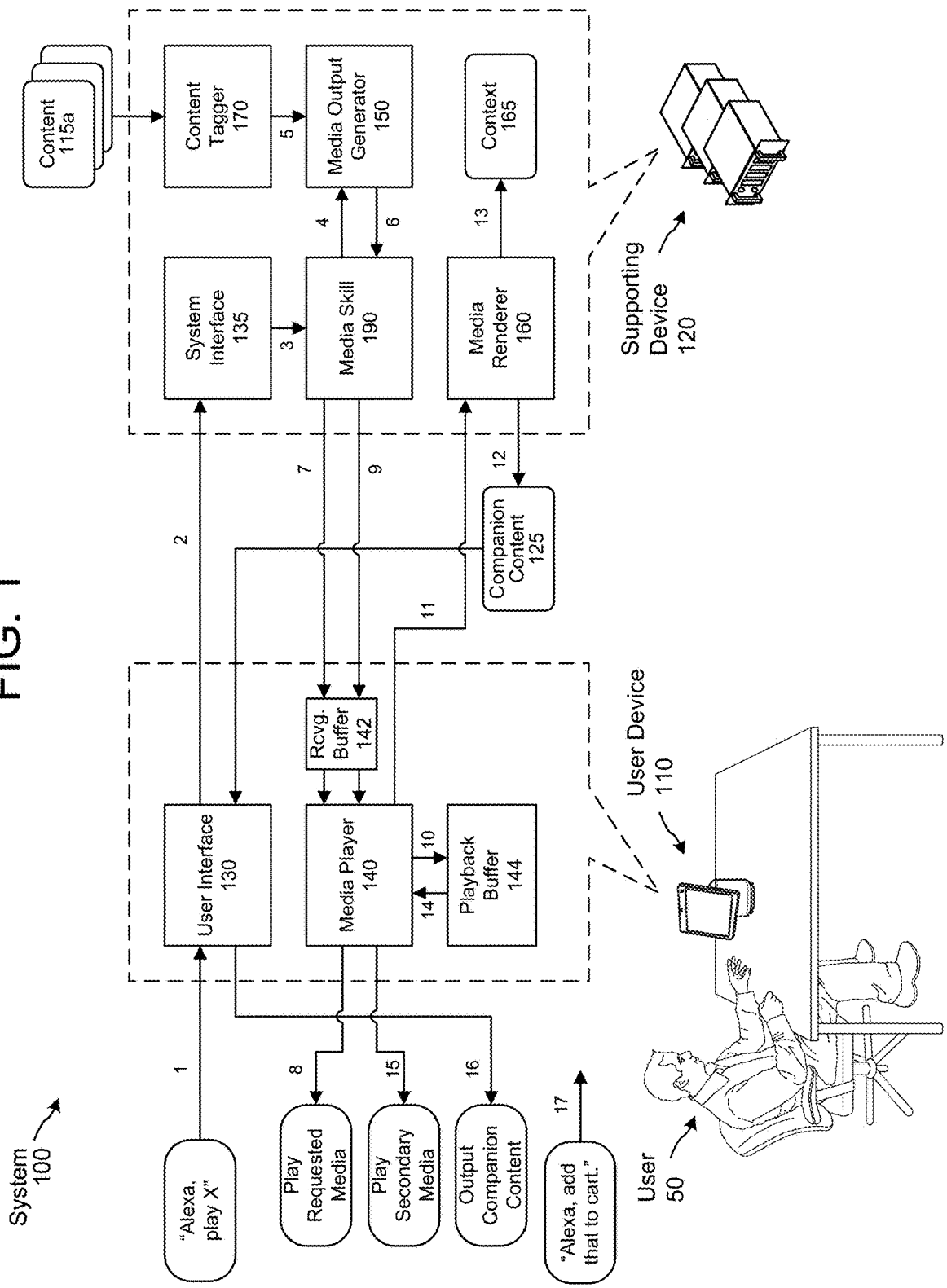

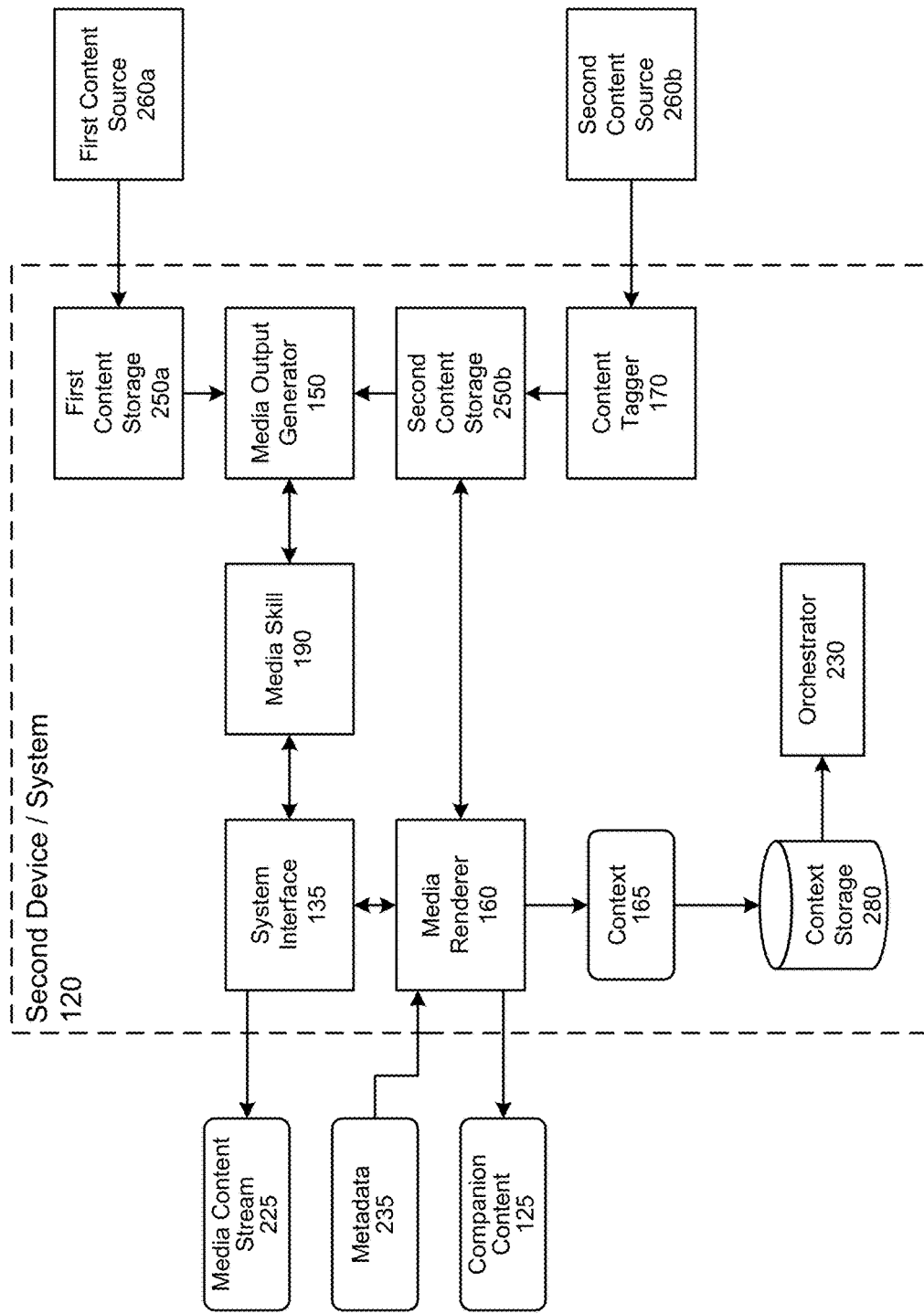

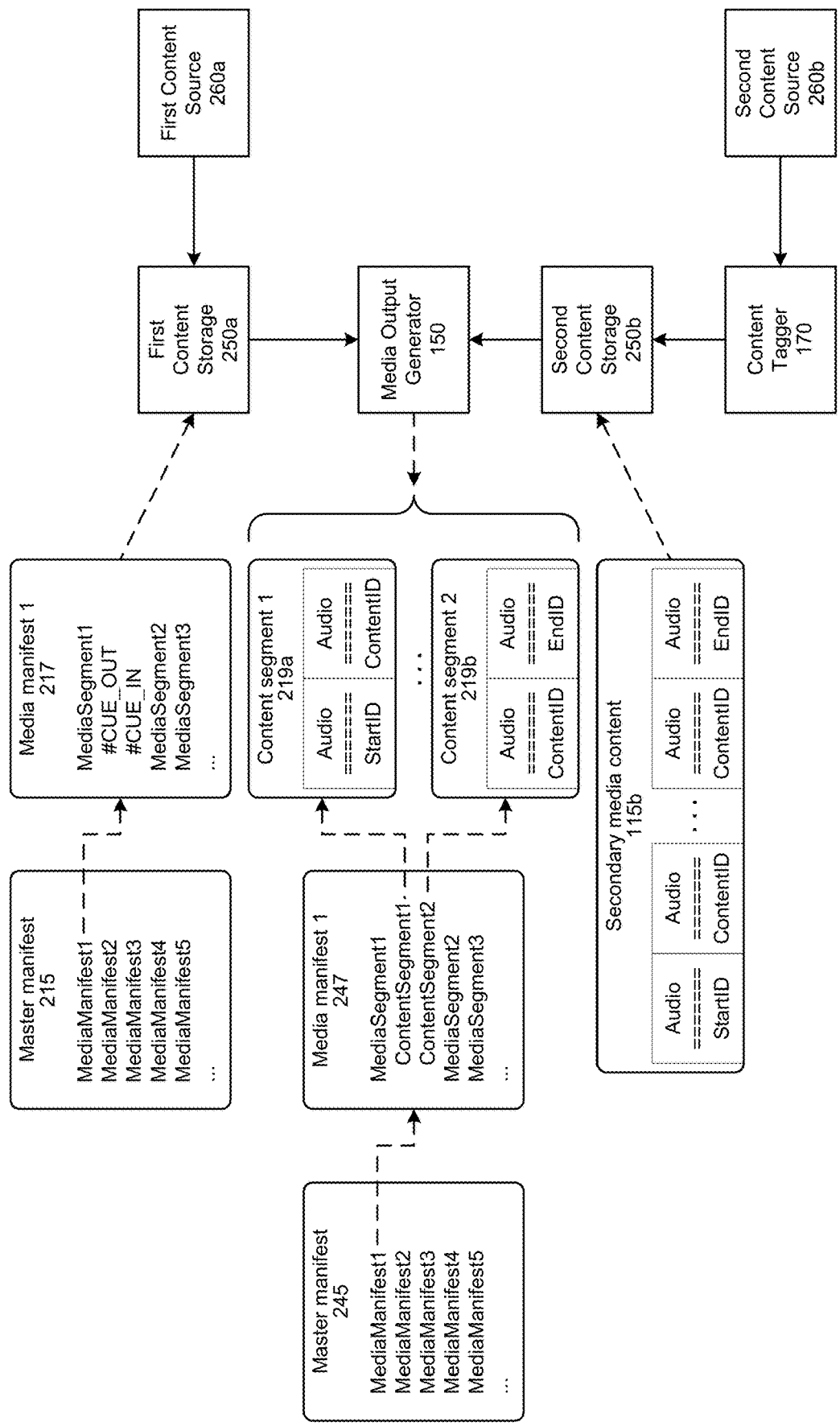

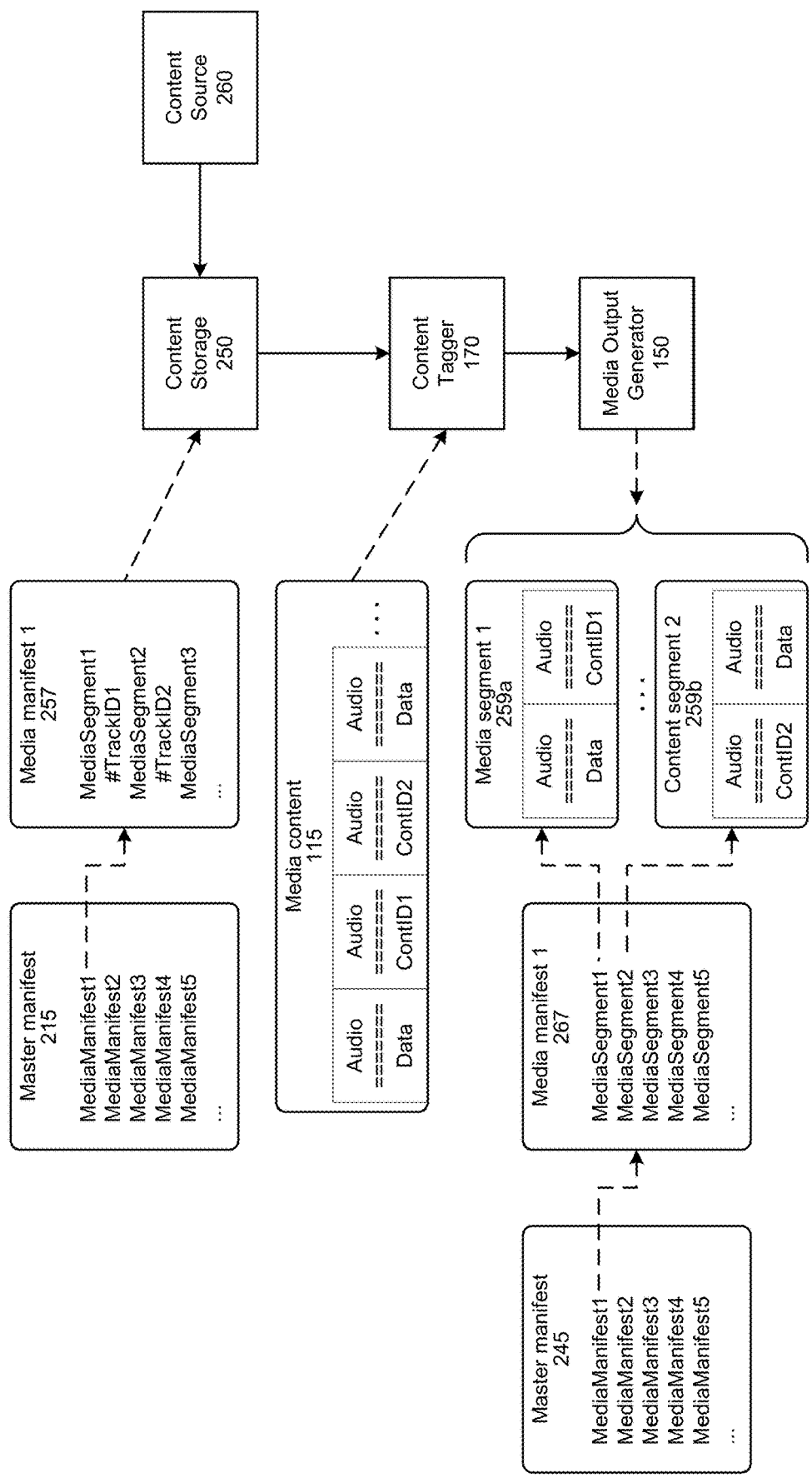

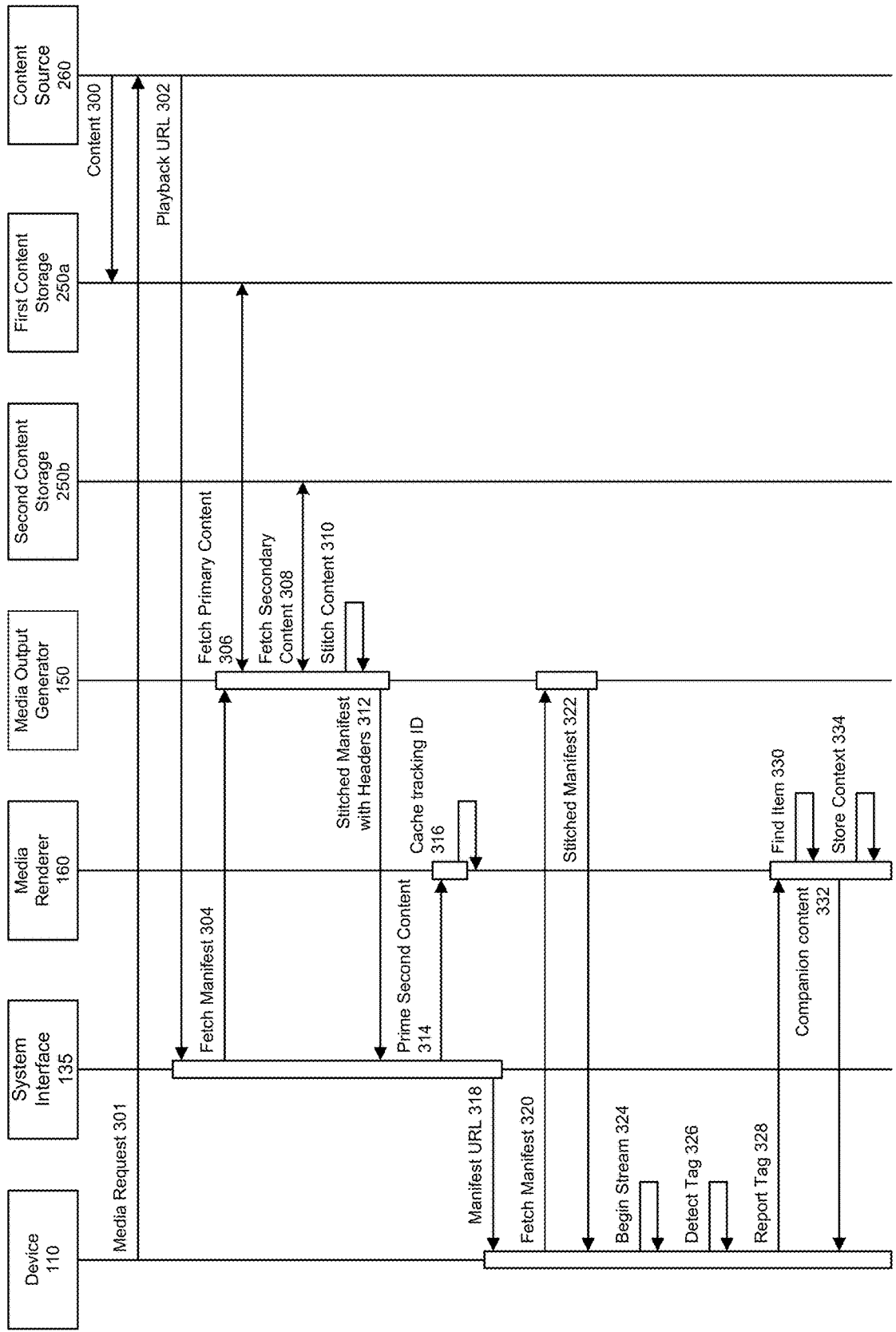

US 11,977,816 B1

TIME-BASED CONTEXT FOR VOICE USER INTERFACE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating example operations of a system implementing a media marker mechanism, according to embodiments of the present disclosure.

FIGS. 2A through 2C are a conceptual diagrams illustrating example components of the media marker mechanism in the system, according to embodiments of the present disclosure.

FIG. 3 is a signal flow diagram illustrating communication between components of the system, according to embodiments of the present disclosure.

DETAILED DESCRIPTION

Figure 4:
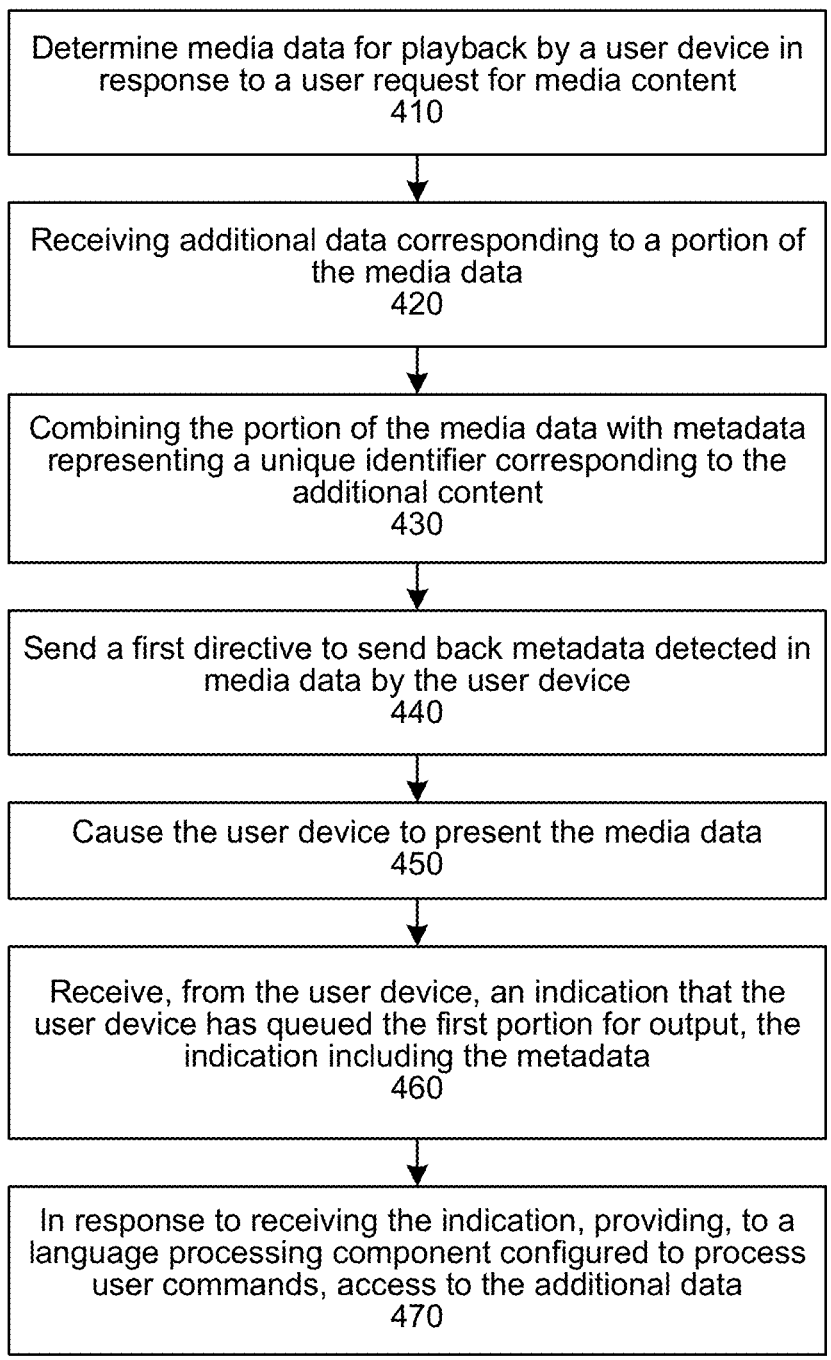
FIG. 4 is a flowchart illustrating an example method of implementing the ad marker mechanism in the system, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a virtual assistant system or other type of speech-processing system.

A user can interact with a speech-processing system using voice commands and/or other input, and the speech-processing system may perform actions for and/or on behalf of the user in response. Certain functions of the speech-processing system may be divided and/or shared between different components of the speech-processing system. The user may interact with a user device, which may operate in conjunction with supporting device such as a second device or server, etc. For example, a user may utter a command, such as "Alexa, play a podcast." The user device and/or supporting device may have speech processing components to identify a command or request represented in the speech and determine a corresponding action to perform. The user device and/or supporting device may include other components, such as an application or "skill" configured to perform the requested action. In this example, the skill may provide media content for playback on the device.

The supporting device may prepare media content for presentation by the user device. The media content may include, for example, a podcast, movie, television show, music, a news program, sports program, radio show, etc. The media content may be sent to the user device in the form of media data (e.g., audio and/or video data) divided into segments that can be played in sequence. The supporting device may insert one or more additional media content items (e.g., announcements, advertisements, reminders, etc.) between segments of the requested media content. A media content item may include a call to action such as asking the user to, for example, to check out a product or service, click an image or link to open a webpage, set vehicle navigation to a business, add an item to a digital shopping cart, etc. In response, the user may utter another command to the system; for example, "Alexa, add this to my calendar," "Alexa, add that to my cart," etc. The speech processing components of the system may process the utterance and, if it is able, determine information not explicitly stated in the command. For example, the system may resolve exophora/anaphora or the like, to determine what "this" or "that" refers, what is to be confirmed, etc., to perform the requested action.

To process an utterance that lacks specificity, the speech processing components may use context about what media content item is playing or was recently played. In some cases, however, the speech-processing system may not know what media content is or was just presented to the user. For example, the user device may buffer the media data for some period of time prior to playback (e.g., fractions of a second to minutes), and the duration of latency within the buffer may change based on, for example, network traffic conditions, user intervention such as pausing, adjusting playback speed, fast-forwarding, among other factors. Network lag may add further variability to an offset between transmission of the media content item and its eventual playback. Thus, the speech processing components may be configured to operate in the absence of being able to accurately determine a time of playback of the media content item based solely on a time of transmission to the user device. Moreover, the user device may output multiple consecutive media content items in succession, compounding the difficulty of determining which media content item a received command pertains to, particularly when durations of the media content items are shorter than the variability in latency between transmission and playback. An accurate indication of when a particular media content item is actually played back by a user device may assist the supporting device in handling a request or command that refers to a particular media content item and/or synchronizing other operations related to playback of the media content item.

Offered are systems and methods for using a media marker mechanism to enhance capabilities of a speech-processing system for handling media content items. The speech-processing system can implement the media marker mechanism to share time information about playback of a media content item between, for example, a user device and a supporting device. In an example operation, the supporting device may tag a media content item with metadata that can be read by the user device as it plays the media content. The device can play the streaming media content and, when a tagged portion of the media content plays (e.g., is queued for playback), the user device can read the metadata and send back to the supporting device. The supporting device can use the metadata to enrich the media content delivery by, for example, providing a companion image on a screen of the user device, providing a link to make the companion image clickable, resolve exophora/anaphora in requests that refer to the media content, etc.

The media marker mechanism can give the supporting device an accurate (e.g., within a second, fraction of a second, or a few seconds) indication of when the user device begins or will begin playback of the tagged media content item; and, in some cases, when playback of the media content item ends. An accurate indication of the beginning of playback can enable one or more enhanced capabilities of the speech-processing system corresponding to presentation of the media content item. For example, the media marker mechanism can be used to identify a companion image to provide to the user device as well as to indicate to the user device when to present the companion image for display such that the image appears concurrently with output of the media content item. In another example, the media marker mechanism can indicate to the supporting device which media content item the user device is presenting at a particular time, allowing the supporting device to process a user request using information corresponding to the correct media content item (e.g., rather than one that streamed before or after). These and other features of the disclosure are provided as examples, and maybe used in combination with each other and/or with additional features described herein.

FIG. 1 is a conceptual diagram illustrating example operations of a system 100 implementing a media marker mechanism, according to embodiments of the present disclosure. In the example operations shown in FIG. 1, a user 50 requests media content from the system 100, and the system 100 plays the content. In addition, the system 100 selects additional media content to play for the user. The system 100 may offer additional capabilities such as outputting companion content 125 to the user 50 and/or using context 165 (e.g., information used to determine one or more actions to take when the user 50 engages with content) to components of the system 100 to process, for example, user 50 commands that refer to the additional media content.

The system 100 may include one or more devices, such as a user device 110 and a supporting device 120 (e.g., a server hosting a cloud service). The user device 110 and the supporting device 120 may communicate over one or more computer networks, such as the computer network 199 shown in FIG. 6. The user device 110 and/or the supporting device 120 include components that perform the operations. For example, the user device 110 may include a user interface component 130. The user interface component 130 may be, for example, logic and/or software such as an application that may provide user interface functionality such as a voice user interface (VUI) and/or a graphical user interface (GUI). The user interface component 130 may also communicate with the supporting device 120 to provide user access to additional functions/services hosted thereon, such as additional speech-processing capabilities, skills, etc. In some implementations, the supporting device 120 may host a system interface component 135 system interface component 135 with which the first user interface component 130 may communicate to access the components and/or functions of the supporting device 120. The user device 110 may include other components/features such as a media player 140 that may play media from a storage component of the user device 110 and/or streamed over the network 199. As described in additional detail below, the media player 140 may be configured to read metadata of media files and send information from the metadata to the supporting device 120.

supporting device 120 The supporting device 120 may include one or more skills such as a media skill 190 configured to stream media content to the user device 110. The supporting device 120 may include a media output generator 150, which may prepare media content for streaming to the user device 110. For example, the media output generator 150 may receive media content 115a, 115b, 115c, etc., (collectively, "media content 115"), and combine them into a media stream. The media content 115 may include first media content 115a, which may represent primary media content requested by the user 50. The media content 115 may include additional media content 115b, 115c, etc., which may represent additional media content such as reminders, advertisements, notifications, etc. One or more items of media content 115 may include metadata readable by the media player 140 (e.g., during output by the user device 110). The media output generator 150 may order the media content 115 into a sequence of media content segments for playback in order by the media player 140. The media output generator 150 may generate a list of identifiers (e.g., a "manifest") corresponding to the media content segments. The media player 140 can receive the manifest, and request the media content segments in order for streaming from the media skill 190. A media renderer 160 may receive metadata read by the media player 140, and access additional information about the media content 115. The media renderer 160 may, for example, provide companion content 125 for output with a particular media content item and/or context 165 for processing commands referring to a particular media content item.

In an example operation, the user 50, at a step 1, may speak a wakeword and command to the system 100; for example, "Alexa, play X," where X represents a name of media content the user 50 wishes the system 100 to play. Detection of the wakeword may activate the user interface component 130, which may capture audio data of the user's 50 speech and, in a step 2, send it to the system interface component 135. In some implementations, the system interface component 135 may route the received data for processing—for example, using language processing components 692—to identify a user command or request, and send the command to a skill 190 for processing. Once the language processing components 692 (described in additional detail below with reference to FIG. 6) have processed the audio data, the system interface component 135 may, at a step 3, send the name of the requested media content to the media skill 190. The media skill 190 may, at a step 4, request the media content from the media output generator 150. The media output generator 150 may, at a step 5, receive the requested media content 115*a* and one or more items of additional media content 115*b*, 115*c*, etc. for playback with the requested media content 115*a*. One or more of the media content 115 may include metadata applied by a content tagger 170. The metadata may include an identifier that components of the system 100 may use as part of a media marker mechanism to enhance capabilities of the system 100 for presenting media content and/or handing related user requests/commands. Operation of the content tagger 170 is described in additional detail below with reference to FIGS. 2A through 2C. The media output generator 150 may prepare a list or "manifest" of media content segments. The media content segments may represent portions of the media content 115, such as a few seconds or a few minutes of a longer piece of content such as a livestream, long podcast, etc. The media output generator 150 may insert additional media content 115*b* between segments of the primary media content 115*a*. The manifest may thus represent an ordered sequence of media content segments for playback by the user device 110. The media output generator 150 may, at a step 6, send the manifest to the media skill 190. The media skill 190 may send the manifest to the media player 140.

The media player 140 may begin playback of the requested media. The media player 140 may playback the media by requesting each media content segment identified in the manifest from the media skill 190. The user device 110 may, at a step 7, receive the first requested media content segment from the media skill 190 and store it in a receiving buffer 142. The receiving buffer 142 may store a few seconds to a few minutes of media to prevent interruptions in playback of requested media in the event of a network interruption, dropped or corrupted data packets, etc. Incidentally, storing the media data in the receiving buffer 142 for an undetermined interval of time may cause the variable in the latency between transmission of media data by the supporting device 120 and playback of the media data by the user device 110. Thus, for tagged items of media content 115, the system 100 may employ the media marker mechanism to indicate to the supporting device 120 when the tagged media is output. The media player 140 may, at a step 8, retrieve the first requested media content segment from the receiving buffer 142 and output content to the user 50.

The media player 140 may, at a step 9, receive secondary media content from the media skill 190, such as a tagged segment of secondary media content 115*b*. In some cases, the user device 110 may store the secondary media content 115*b* in the receiving buffer 142. The secondary media content 115*b* may represent, for example, a notification, message, advertisement, etc., for output to the user 50 during playback of the requested media content (e.g., during a pause in playback of the requested content). The media player 140 may retrieve the secondary media content 115*b* from the receiving buffer 142 and prepare it for playback. The media player 140 may, at a step 10, store the secondary media content 115*b* in a playback buffer 144. The playback buffer 144 may store a fraction of a second or several seconds of media content queued for playback. The playback buffer 144 may maintain continuity of media playback while a CPU and/or other component of the user device 110 performs other operations.

The media player 140 may read the metadata contained in the media content 115*b* and, at a step 11, send the metadata to the media renderer 160. The supporting device 120 may determine based on a time of receipt of the metadata that output of the additional media content has recently begun or will begin shortly. In some implementations, the metadata can be sent with an indication of output timing; for example, representing a clock time and/or a time offset for the beginning of the output of the additional media content. The media renderer 160 may, using the metadata, retrieve additional data regarding the additional media content item. The additional data may include companion content for output with the additional media content item and/or entity information regarding something named or otherwise referenced in the additional media content. The media renderer 160 may, at a step 12, send the companion content 125 for output by the user device 110. The companion content 125 may include, for example, image data for output via a display of the user device 110. The companion content 125 may include a uniform resource locator (URL), e.g., a "link," activatable by selecting or "clicking" the displayed image. Selecting the URL may cause the user device 110 access an online resource; for example, by navigating a browser to a website, viewing a particular app in an app store, viewing a particular media item (e.g., podcast, movie, etc.) at a media host, and/or perform some other action related to the additional media content 115*b*.

The media renderer 160 may send the companion content 125 in the form of a directive, instruction, and/or modification of on-device logic. For example, the companion content 125 may include an update or modification to a document or other file used to define outputs from the user device 110. For example, the companion content 125 may include a directive with an Alexa Presentation Language (APL) document (or modification thereto). An APL document may be similar/analogous to an HTML, document in that it may define a template to display on a device with a screen and control structure and layout of media content output by the device. Such a document may include other information such as URLs or other identifiers that may be activated when a user selects an item or element in a displayed image. The document may further include logic that may specify a time window during which to display a companion image corresponding to an item of secondary media content 115*b*. The logic may specify that the user device 110 should present an image (or other companion media) when the user device 110 outputs (e.g., begins outputting) the secondary media content 115*b*. The logic may specify an expiration (e.g., a closing of the time window) when the user device 110 should cease displaying companion media. The time window may correspond to a duration of the secondary media content 115*b*; for example, by commencing upon outputting the secondary media content 115*b* and expiring after an interval corresponding to the playback duration of the secondary media content 115*b* (e.g., 15 seconds, 30 seconds, etc.). In some implementations, the time window may be a fraction of the playback duration of the secondary media content 115*b*, but may be refreshed each time the media player 140 reads another metadata tag on another segment of the secondary media content 115*b* queued for output. The use of multiple metadata tags applied to media content 115 periodically or continuously may enable the system 100 to provide companion content 125 and/or context 165 for a piece of media content 115 even if the user pauses playback or performs seek operations (e.g., fast-forward, rewind, slow-motion or frame-by-frame playback, etc.).

The media renderer 160 may, at a step 13, generate context 165 related to the additional media content 115*b*. The media renderer 160 generate the context 165 before, during, and/or after providing the companion content 125. The media renderer 160 may cache the context 165 in, for example, the context storage 280 described below with reference to FIGS. 2A through 2C. The context 165 may include information related to the additional media content 115*b* such as information on how to process commands referring to the additional media content 115*b*. The information may include intent, skill, and/or entity data about a product or service referenced in the additional media content 115*b*. The context 165 may also include timing information about, for example, when the user device 110 began outputting the additional media content 115*b*, a duration of the additional media content 115*b*, and/or when the user device 110 finished (or is predicted to finish) outputting the additional media content 115*b*. Components of the system 100 may use the context 165 to process commands received during and/or shortly after output of the additional media content 115*b*.

The media player 140 may, at a step 14, retrieve the media content 115 from the playback buffer 144. The media player 140 may, at a step 15, play the secondary media content 115*b*. The media player 140 may read the metadata again, and perform any operations dictated by on-device logic corresponding to the metadata (e.g., presenting companion media such as an image and/or providing a URL). For example, the user interface component 130 may, at a step 16, output companion content such as an image on a display. The media player 140 may also send the metadata (and, in some cases, continue periodically sending during playback of the secondary media content 115*b*) to the media renderer 160 to keep the context 165 up to date to enable the system 100 to handle user commands referencing the secondary media content 115*b*. For example, the user 50, at a step 17, may utter: "Alexa, add this to cart," where "this" may refer to an item mentioned in the additional media content 115*b*. Using the context 165 generated at the step 13, the system 100 may determine that the utterance received at the step 14 pertains to a particular entity identified in the context 165. The language processing components 692 and/or other components of the system 100 may thus be able to use the context 165 to identify an intent and/or resolve an entity to execute the user 50 command (e.g., without requesting additional information from the user 50).

Although certain components of the system 100 have been described with reference to one of the user device 110 or the supporting device 120, one or more components may exist on the other device, both devices, and/or divided between the devices.

FIGS. 2A through 2C are a conceptual diagrams illustrating example components of the media marker mechanism in the system 100, according to embodiments of the present disclosure. The system 100 can provide a media content stream 225 (e.g., a sequence of segments of media content 115). When a tagged portion of media content 115 is output, the system 100 may read and process metadata 235 from the tagged portion. Using the metadata, the system 100 may provide companion content 125 and/or generate context 165 for the media content 115.

As shown in FIG. 2A, the system 100 may include a system interface component 135. The system interface component 135 may be an interface through which the user 50 may access cloud services via the user device 110; for example, one or more skills such as the media skill 190. The system interface component 135 may additionally interact with the media renderer 160 for processing the metadata 235 and delivering the companion content 125 to the user device 110.

The media skill 190 is an application, component, and/or system configured to respond to user requests for media files and/or streams. The media may include music, podcasts, livestreams of sporting or other events, educational classes, etc. The media may be audio only or multimedia; for example, including video or still images, accompanying text, directives for generating and/or controlling immersive elements of a multimedia experience such as device movement, vibration, lights, etc. The media skill 190 may provide media from a single source (e.g., a news network, athletic league, publisher, etc.) or may provide media from multiple sources. In some implementations, the system 100 may include multiple or many media skills 190, in addition to other skills 190 as described below with reference to FIG. 6.

A media skill 190 may provide media from one or more content sources 260*a*, 260*b*, etc. (collectively, "content sources 260"). In some implementations, the first content source 260*a* may provide the primary media content 115*a* that was requested by the user. In some implementations, the first content source 260*a* may provide the primary media content 115*a* in portions and/or with insertion points for secondary media content 115*b* already specified. In some implementations, the system 100 (e.g., using the media output generator 150 or other component) may portion the media content and/or determine insertion points. A first content storage 250*a* may receive the primary media content 115*a* and store it until a request for it is received by the system 100. The primary media content 115*a* may be described by a manifest document (described further below), with segments of the primary media content 115*a* identified in an ordered sequence. The manifest may define insertion points for inserting segments of secondary media content 115*b*, which may be added by the media output generator 150.

In some implementations, one or more second content sources 260*b* may provide secondary media content 115*b* to be inserted between portions of, and/or at the insertion points specified in, the primary content; for example, advertisements added to sports content, although other types of secondary content are possible including notifications, messages, etc., which may be lower priority and thus inserted into the primary media content stream rather than interrupting it arbitrarily. The secondary content may represent content that is not directly requested by the user (e.g., in contrast to the primary content, which the user 50 may request by name, URL, and/or other identifier). The secondary content may be independent of the primary content; for example, received from different content sources 260. In some cases, however, the secondary content may be related to the primary content; for example, presenting an ad for sporting goods during primary content corresponding to a sporting event.

The second content source 260b may provide the secondary media content 115b to a second content storage 250b, which can store the secondary media content 115b until it has been selected by the media output generator 150 for insertion into primary media content 115a. The second content source 260b may provide additional information with the secondary media content 115b, such as companion content, a URL, entity and/or intent data, etc., which the second content storage 250b may also store. The second content storage 250b may store the content in the form of, for example, a document such as an extensible markup language (XML) document, real-time binding (RTB), and/or a digital video ad serving template (VAST) document. The document may include the context 165 and/or the companion content 125 or pointers to stored companion content 125.

When the system 100 receives the secondary media content 115b, a content tagger 170 may "tag" the media file by applying an identifier to it. The system 100 may use the identifier for tracking the secondary media content 115b and/or retrieving information about the secondary media content 115b (e.g., the companion content, URL, entity and/or intent data, etc.). The content tagger 170 may apply the identifier to the secondary media content 115b by one or more various mechanisms. In some implementations, the content tagger 170 may apply a tag in the form of a metadata container. The metadata container may be, for example, ID3 (used with .mp3 audio files), APE (used with .mp3 and .ape audio files), Vorbis comment (used with various audio and video file formats), etc. The content tagger 170 may apply the tag at the beginning of the secondary media content 115b such that the media player 140 reads the tag when commencing playback of the secondary media content 115b. In some implementations, the content tagger 170 may also apply a tag at an end of the secondary media content 115b to allow the system 100 to detect when playback of the secondary media content 115b has completed (e.g., such that the user interface component 130 can cease output of companion content 125).

In some implementations, the content tagger 170 may embed a "watermark" to the secondary media content 115b. A watermark may be metadata in the form of an audio signal, inaudible to humans but detectable by a device, added to an audio file, stream, or signal, to suppress wakeword activation of voice-controlled devices or perform other function (s). For example, an audio advertisement, TV show, movie, etc., may include a spoken wakeword. To prevent the wakeword from inadvertently activating a voice-controlled device (e.g., either the device outputting the audio or another nearby device), the audio file may include a watermark at least partially overlapping the wakeword. A voice-controlled device receiving the audio may detect the watermark and temporarily deactivate wakeword detection and/or ignore a wakeword activation signal. Such watermarks may carry data, and thus be used to convey an identifier in a manner analogous to detection of a metadata container applied to the secondary media content 115b. Thus, when the secondary media content 115b is output by the user device 110, the user interface component 130 may detect the watermark, read the identifier, and send it to the media renderer 160. In some implementations, the user device 110 may detect the watermark internally; for example, by detecting the signal in a digital and/or analog audio signal prior to output. In some implementations, the user device 110 may detect the watermark acoustically; for example, from the output audio via one or more microphones of the user device 110.

The media output generator 150 may prepare media for streaming to the user device 110 in response to a request. When the media output generator 150 receives a request for media content, the media output generator 150 may retrieve the requested primary media content 115a from the first content storage 250a. The media output generator 150 may retrieve a manifest describing the primary media content 115a. The manifest may include one or more cue points representing places where secondary media content 115b may be inserted into the primary media content 115a. The media output generator 150 may include or communicate with additional components for selecting secondary media content 115b for insertion in the primary media content 115a. Selection of the secondary media content 115b may be based on various factors including a length of secondary media content 115b to be inserted (e.g., as specified in the manifest or other data associated with the primary media content 115a), relatedness to the primary content (e.g., by keyword, topic, etc.), relevance to a user profile associated with the request (e.g., provided by the request and/or determined with a user recognition component 695 described below with reference to FIG. 6), etc. In some implementations, audience preference may be specified by the second content source 260b. In some implementations, secondary content preferences (e.g., favored and/or disfavored topics, age-based restrictions and/or preferences, etc.) may be specified by a user profile and/or policies associated with or applying to the user profile.

Having identified one or more items of secondary media content 115b for insertion into the primary media content 115a, the media output generator 150 may generate a manifest identifying an ordered sequence of audio files for playback. The manifest may refer to one or more portions of primary media content 115a with one or more items of secondary media content 115b inserted. The media output generator 150 may provide the manifest to the media skill 190 in response to the request, and the media skill 190 may forward the manifest to the media player 140 via the system interface component 135. In some implementations, the manifest may be a UTF-8 encoded audio playlist file (m3u8 file). An m3u8 file is a plain text file that can describe here individual medial files are located. In some implementations, the system 100 may employ multiple manifests for a media content stream 225. Each manifest may include pointers to a certain number of segments of media content or segments of media content adding up to a certain amount of time. The media player 140 may fetch a first manifest, request the segments of media content, and fetch a second manifest when all content in the first manifest has been downloaded.

The media player 140 may begin streaming the media content stream 225 by requesting audio data corresponding to a first identifier in the manifest. The media content stream 225 may be delivered as, for example, an HTTP LiveStream (HLS). The media player 140 may request the media content sequentially and/or in batches (e.g., by requesting two, three, four . . . segments at a time). The media player 140 may buffer several seconds to several minutes of the media content stream 225 to enable it to provide uninterrupted output of the stream even if some data is delayed in transit from the media skill 190 and/or content storage 250. For example, the media player 140 may request a segment of the media content stream 225 some time prior to completing playback of the previous segment. In some implementations, the buffer may be set to 30 seconds.

The media player 140 may detect, extract, or otherwise read data and/or metadata from segments of the media content stream 225. The media player 140 may read the metadata when receiving the segment and/or when commencing playback of the segment. For example, the media player 140 may read an ID3 tag or other metadata attached to a segment of secondary media content 115b. Additionally or alternatively, the media player 140 (or other component) may detect metadata such as a watermark applied to the secondary media content 115b. The media player 140 may send the metadata 235 (or a portion of the metadata such as an identifier) to the system interface component 135, which may forward it to the media renderer 160.

The media renderer 160 may, using the identifier in the metadata 235, store the context 165 of the media content stream 225 in a context storage 280. Various components of the system 100, such as those further described with reference to FIG. 6, may query the context storage 280 for the context 165 when processing a command referring to the secondary media content 115b. The components may use the context 165 to identify information for handling the command. For example, the context 165 may be used by an NLU component to identify, determine, and/or rank intents corresponding to a command received during output of the secondary media content 115b, resolve entities implied or stated, select a domain, etc. The context 165 may be used by an orchestrator component 230 to select a skill for handling the command. The context 165 may be used by a skill for tracking the engagement with the secondary media content 115b, etc.

The media renderer 160 may, using the context 165 stored in the context storage 280, retrieve additional data about the secondary media content 115b; for example, from the second content storage 250b. The additional data may include, for example, companion content 125 and/or context 165. The system 100 may use the companion content 125 and/or context 165 to increase and/or improve its capabilities for presenting the secondary media content 115b, receiving additional user 5 engagement with the secondary media content 115b, and/or processing user 5 input referencing the secondary media content 115b. In some implementations, the media renderer 160 may determine hardware capabilities and/or permissions associated with the user device 110. For example, the media renderer 160 may select companion content to send to the user interface component 130 depending on, for example, whether the user device 110 has a visual display, controllable lights, controllable vibration, etc. In some implementations, the media renderer 160 may determine functionalities and/or permissions associated with other components of the system 100. For example, the media renderer 160 may identify and/or select one or more skills 190 for processing a command referring to the secondary media content 115b, such as a command to add a referenced item to a digital shopping cart, confirm a calendar reminder, acknowledge a notification, etc.

The media renderer 160 may send the companion content 125 to the system interface component 135 for forwarding to the user interface component 130 for output by the user device 110. The companion content 125 may include, for example, one or more directives related to an image, images, or video to display via the user device 110. The companion content 125 may include a URL to make an image "clickable," such that if the user 5 selects the image or a portion of the image, the user interface component 130 can retrieve data and/or perform an action corresponding to the URL.

The media player 140 may be configured to read the metadata 235 and send it to the system interface component 135 with timing that coincides with playback (e.g., output) of the secondary media content 115b. The system 100 may, by timing transmission of the metadata 235, provide the companion content 125 at a time synchronous with playback of the secondary media content 115b. Similarly, the system 100 may use the context 165 to process commands received during and/or shortly after playback of the secondary media content 115b. The companion content 125 and/or context 165 may include or be associated with timing data corresponding to a duration of the secondary media content 115b. For example, if the secondary media content 115b is 15 seconds long, the media renderer 160 may send a directive to the user interface component 130 to display an image in the companion content 125 for 15 seconds after beginning playback of the secondary media content 115b. In some implementations, the duration of display of an image may be shorter or longer than the playback duration of the secondary media content 115b. In some implementations, the secondary media content 115b may include a tag at its beginning and at its end, such that the end tag can be used to time cessation of the output of the companion content 125.

FIG. 2B is a conceptual diagram that illustrates operations of the content tagger 170 and media output generator 150, according to embodiments of the present disclosure. The second content storage 250b may receive an item of secondary media content 115b from the second content source 260b. The secondary media content 115b may be a data file having successive portions of audio data. The content tagger 170 may apply metadata to the secondary media content 115b. The metadata may be applied as an identifier (e.g., uniquely associated with the particular item of secondary media content 115b) associated with a portion of the audio data. In some implementations, an identifier may be associated with multiple portions of the audio data. In some implementations, the content tagger 170 may apply a different identifier at a first portion and/or last portion of the audio data. For example, the content tagger 170 may apply a Start ID a first portion of the audio data and/or an EndID to a last portion of the audio data. The content tagger 170 may apply a ContentID to one or more other portions of the audio data. Similar manners of applying metadata to the secondary media content 115b are possible for video and/or other multimedia content; for example, by applying metadata to an audio channel and/or to frames of video data, etc.

The first content storage 250a may receive an item of primary media content 115a from the first content source 260a. The primary media content 115a may be a sequence of data files as described by a master manifest 215 and/or one or more media manifests 217. In some implementations, different items of primary media content 115a may have only a single manifest. The master manifest 215 may include identifiers that point to one or more media manifests 217 that describe the primary media content 115a. A media manifest 217 may include identifiers that point to one or more data files that make up the primary media content 115a. A media manifest 217 may include markers that specify a point (e.g., between media segments) where an item of secondary media content 115b may be inserted ("stitched") into the media content stream 225. In the media manifest 217 shown in FIG. 2B, the insertion marker is represented as "#CUE OUT" and "#CUE IN."

The media output generator 150 may identify an insertion marker (e.g., "#CUE OUT" and "#CUE IN.") in the primary media content 115*a* and/or ad one or more insertions markers to the primary media content 115*a*. In either case, the media output generator 150 may, for an insertion marker, select an item of secondary media content for insertion at the insertion marker. The media output generator 150 may generate a new master manifest 245 and/or one or more media manifests 247 for the media content stream 225. The master manifest 245 may include identifiers pointing to one or more media manifests 247. A media manifest 247 may identify an ordered sequence of media files for playback. Where the insertion marker appeared in the media manifest 217, the media manifest 247 may specify one or more content segments 219*a*, 219*b* of the secondary media content 115*b* selected for insertion by the media output generator 150. A content segment 219 may include one or more portions of audio data, and may include metadata associated with one or more of those portions. The media output generator 150 may send the master manifest 245 to the user device 110. The media player 140 may playback the media content stream 225 by requesting each media manifest 247 identified in the master manifest 245 in turn. For each media manifest 247, the media player 140 will request and playback each identified media segment and/or content segment 219. When the media player 140 receives a media segment and/or content segment 219, it may detect metadata, and handle the metadata using the techniques discussed herein to, for example, request and present companion content and/or prime the supporting device 120 for handling commands referring to the content identified by the metadata.

FIG. 2C is a conceptual diagram that illustrates operations of the content tagger 170 and media output generator 150 in example operations in which a single item of media content is tagged in a specific location, according to embodiments of the present disclosure. In some situations, a user may request an item of media content that may have secondary content pre-embedded; for example, as a different portions of a media file and/or product placements and/or mentions in the media content itself. A tracking identifier "TrackID" may be noted with a media segment to which it corresponds, as reflected in the media content 115 and/or the media manifest 257. The content tagger 170 may apply a content identifier "ContID" to a portion of audio (and/or a frame of video or other data) of the media content 115. The resulting media manifest 267 will reflect media segments 259*a*, 259*b*, etc., representing segments of the media content 115 with the content identifiers applied. The media player 140 may use the master manifest 245 and/or the media manifest 267 to request and playback the media segments 259 of the media content 115. When the media player 140 detects the content identifier in the metadata, it may echo the content identifier back to the media renderer to perform content enhancements as described herein.

FIG. 3 is a signal flow diagram illustrating communication between components of the system 100, according to embodiments of the present disclosure. FIG. 3 illustrates communications between the user device 110 (e.g., including the user interface component 130 and/or the media player 140), the system interface component 135 (e.g., executing on a supporting device 120), the media renderer 160, the media output generator 150, a first content storage 250*a*, a second content storage 250*b*, and a content source 260 (e.g., a first content source 260*a* providing primary media content).

The content source 260 may generate content and send (300) the content to the first content storage 250*a*. The content may include one or more media files representing primary media content 115*a* as well as additional information about the primary media content 115*a*; for example, companion content 125 and/or context 165. The first content storage 250*a* may store the content for retrieval when requested by a user. A user may request the primary media content 115*a* using the user device 110. The user device 110 may send (301) the request to the content source 260 (e.g., via one or more components of the system 100). In response to the request, the content source 260 may send (302) a playback URL to the system interface component 135. The playback URL may specify how to access the primary media content 115*a* from the first content storage 250*a*. The system interface component 135 may fetch (304), from the media output generator 150, a manifest for playback of the primary media content 115*a*.

The media output generator 150 may prepare the manifest using the primary media content 115*a* and secondary media content 115*b*. The media output generator 150 may fetch (306) the primary media content 115*a* from the first content storage 250*a* and fetch (308) the secondary media content 115*b* from the second content storage 250*b*. While the user may request the primary media content 115*a* directly, the media output generator 150 may select one or more items of secondary media content 115*b* for insertion into the media content stream. The media output generator 150 may "stitch" (310) the media content 115 together; for example, by inserting items of the secondary media content 115*b* between segments of the primary media content 115*a* and/or at cue points specified in the primary media content 115*a*. The media output generator 150 may prepare a manifest including headers indicating the media files (e.g., representing the primary media content 115*a* and the secondary media content 15*b*) to be played in sequence. The media output generator 150 may preserve any tags (e.g., metadata, watermarks, etc.) applied to and/or embedded in the secondary media content 115*b*. The media output generator 150 may return (312) the stitched manifest with headers to the system interface component 135. The stitched manifest headers may represent an ordered sequence of identifiers representing segments (e.g., files) of media content that will make up the requested media content stream. The system interface component 135 may, using the tags, prime (314) the system 100 for processing commands related to the secondary media content 115*b*. As a part of the process of priming the system, the media renderer may cache (316) a tracking identifier such as a URL corresponding to the secondary media content 115*b*. The system interface component 135 may thus send (318) a URL corresponding to the manifest to the user device 110.

The user device 110 may, using the manifest URL, fetch (320) the manifest from the media output generator 150. The media output generator 150 may send (322) the manifest back to the user device 110. The user device 110 may begin (324) the stream by requesting a media file (e.g., from a content storage 250). The user device 110 may receive the file and output it using one or more speakers and, in some cases, a visual display. The user device 110 may buffer the data as it is received from the content storage 250 to allow for uninterrupted playback during changing network conditions. The amount of data (e.g., in terms of seconds of playback) stored in the receiving buffer may vary depending on network delays, dropped packets, etc. Thus, a time of transmission of a segment of media content 115 may not be an accurate proxy for when the media content 115 is actually output by the device. The user device 110 may additionally queue the data for playback in a playback buffer. The user device 110 may detect (326) a tag (e.g., metadata, a watermark, etc.) in a segment of media content 115 as the segment is read from the receiving buffer to the playback buffer. For example, the user device 110 may receive secondary media content 115*b* labeled with an identifier that allows the system 100 to retrieve additional data for the purposes of adding system capabilities related to output of the content. The user device 110 may report (328) the tag (e.g., an identifier contained in the metadata and/or watermark) to the media renderer 160. The user device 110 may continue reporting the tag periodically (e.g., every second) that the media content 115 is being presented. The media renderer 160 may retrieve (330) the additional data corresponding to the secondary media content 115*b*. The media renderer 160 may use the additional data to send (332) companion content to the user device 110 (e.g., an image to display, a URL to make the image clickable, etc.) and/or store (334) the context (e.g., in the context storage 280) for use by other components of the system 100 (e.g., for classifying intents, resolving entities, selecting domains and/or skills, etc.).

FIG. 4 is a flowchart illustrating an example method 400 of implementing the ad marker mechanism in the system 100, according to embodiments of the present disclosure. The method 400 may be performed by the components of the system 100 previously described. For example, a supporting device 120 providing media content to a user device 110. The supporting device 120 may include secondary media content for output in coordination with (e.g., during a pause inserted in) media content requested by a user. The supporting device 120 may implement an ad marker mechanism to allow the user device 110 to send back timing and identity information about presentation of secondary media content. The supporting device 120 may use the timing and identity information to, for example, send companion content to the user device 110 for output during presentation of the secondary media content, and/or to determine context 165 for use in processing commands received by the user device 110 during presentation of the secondary media content.

The method 400 may include determining (410) media content for playback in response to a user request for media content. The request may be in the form of a voice command and/or GUI input. In the event of a voice command, the user device and/or supporting device may perform natural language processing to determine that the voice command includes an intent to stream the media content. The supporting device 120 may select the secondary media content from a database of media content items provided by a content source. The secondary media content may represent content independent of the requested content; that is, content not requested by the user but rather determined by the system 100. The secondary media content may represent, for example, a notification, message, advertisement, etc., to be presented to the user before, during, or after playback of the requested media content. The supporting device 120 may select the secondary media content based on a number of factors including, for example and without limitation, a length or duration corresponding to an insertion point in the requested media content (e.g., choosing secondary content of the desired duration), based on a user profile (e.g., as determined by a user recognition component), based on a relatedness to a topic of the requested media content, etc. The supporting device 120 may select the secondary media content on demand; for example, when preparing a portion of the requested media content for sending to the user device 110 (e.g., in some cases, the requested media content may be hours long, and the supporting device 120 may prepare it for streaming in 5-, 10-, 20-minute, etc., portions).

The method 400 may include receiving (420) additional data corresponding to a portion of the media data. The portion of the media data may be the secondary media content, and the additional data may include data for use in enhancing system 100 capabilities related to presentation of the secondary media content. For example, the additional data may include companion content such as an image to display during presentation of the secondary media content. The additional data may include a URL for hot linking the image or a portion of the image such that a user can click the image to access a resource related to the secondary media content (e.g., information about a product, service, topic, system function, etc., related to the secondary media content). Thus, if the secondary media content is an advertisement for a product, the companion content may include an image of a product, and selecting a clickable element of the image may navigate the user's browser to a page where they can learn more about and/or purchase the product. The additional data may include language processing data for use in processing commands received during or following presentation of the secondary media content, and which may relate to the secondary media content. For example, the language processing data may include one or more of a domain, intent, or a named entity corresponding to the secondary media content. Thus, if a user command refers to the secondary media content (or something presented in the secondary media content) anaphorically, the system 100 may identify the thing and/or an action to perform in response to the user command.

The method 400 may include combining (430) metadata with the secondary media content, the metadata identifying companion content corresponding to the secondary media content. The supporting device 120 may attach, add, associate with, etc., metadata such a metadata container or a watermark to the secondary media content. The metadata may include a unique identifier corresponding to the secondary media content. The identifier may be used to store and retrieve additional information about the secondary media content such as companion content (e.g., an image to display, a URL directed to a resource related to the secondary media content, etc.) and/or context data (e.g., for processing commands that refer to the secondary media content).

The method 400 may include sending (440), to the user device 110, a first directive to send back metadata detected in the media data by the user device 110. As described with reference to FIG. 1, the user device 110 may include a receiving buffer 142 and a playback buffer 144. The receiving buffer 142 may store a certain amount media data received from the supporting device 120 to allow for uninterrupted playback of the media data in the event of network delays, lost connections, dropped or corrupted packets, etc. The receiving buffer 142 may store, for example, several seconds, thirty second, sixty seconds, ninety seconds, etc., worth of media data to allow time for receipt of the media data to catch up following an interruption. The user device 110 may read segments of the media data from the receiving buffer 142 and queue them in a playback buffer 144 in preparation for presentation. The playback buffer 144 may store a fraction of a second, a second, or several seconds worth of media data in anticipation of playback such that playback remains uninterrupted even if the CPU and/or memory components of the user device 110 switch to different tasks during playback. When the user device 110 reads a segment of media data from the receiving buffer 142 and writes the segment to the playback buffer 144, it may detect metadata in the media data. For example, it may detect an identifier (e.g., a unique identifier corresponding to secondary media content) in the media data. In some implementations, the media data may include a watermark, such as an audio signal inaudible to a human in an audio data portion of the media data. The user device 110 may decode the watermark to determine the unique identifier corresponding to the secondary media content. In response to detecting metadata in a portion of the media data, the user device 110 may "echo" the metadata (e.g., the unique identifier) back to the supporting device 120. In some implementations, the media data may include repeated instances of the metadata appended to segments of the media data corresponding to the secondary media content. In some implementations, the user device 110 may continue sending the metadata back to the system content periodically during presentation of the secondary media content (e.g., every second or several seconds). The multiple instances of the metadata appended to segments that make up the portion of the media data corresponding to the secondary media content may facilitate functioning of the ad marker mechanism when a user pauses, rewinds, and/or fast-forwards playback during presentation of the secondary media content.

The method 400 may include causing (450) the user device 110 to present the media content (e.g., to present an output based on the media data prepared by the supporting device 120). The supporting device 120 may retrieve and/or generate a manifest for the requested media content. The supporting device 120 may update the manifest to indicate when/where the secondary media content should be inserted (e.g., "spliced") into the requested media content. The supporting device 120 may send the manifest to the user device 110 in response to the request to stream the media content, and the user device 110 may use the manifest to request segments of the media data as listed in the manifest. The user device 110 may request sequential portions of the requested media content using identifiers/headers/links in the manifest. After requesting all portions specified in a manifest, the user device 110 can request a new manifest representing subsequent portions of the requested media content.

The method 400 may include receiving (460) an indication that the user device 110 has queued the first portion of the media data for output. The indication may include the metadata. The indication may reflect that the user device 110 will present or has begun presenting the secondary media content associated with the metadata. The method 400 may include, in response to receiving the metadata, providing (470) providing, to a language processing component configured to process user commands, access to the additional data. The additional data may include language processing data such as domain, intent, and/or entity data that may be used to process and/or respond to user commands referring to the secondary media content. The supporting device 120 may use timing information corresponding to receipt of the indication to determine whether a subsequently received user command pertains to the secondary media content, and/or to determine to which secondary media content item, out of multiple possibilities, a command pertains. In some implementations, the supporting device 120 may use the metadata to retrieve companion content for sending to the user device 110. The supporting device 120 may send the companion content in the form of a directive to update logic on the user device 110 to output companion media (e.g., an image and/or a clickable link, etc.) while the user device 110 is presenting the secondary media content.

Figure 5:
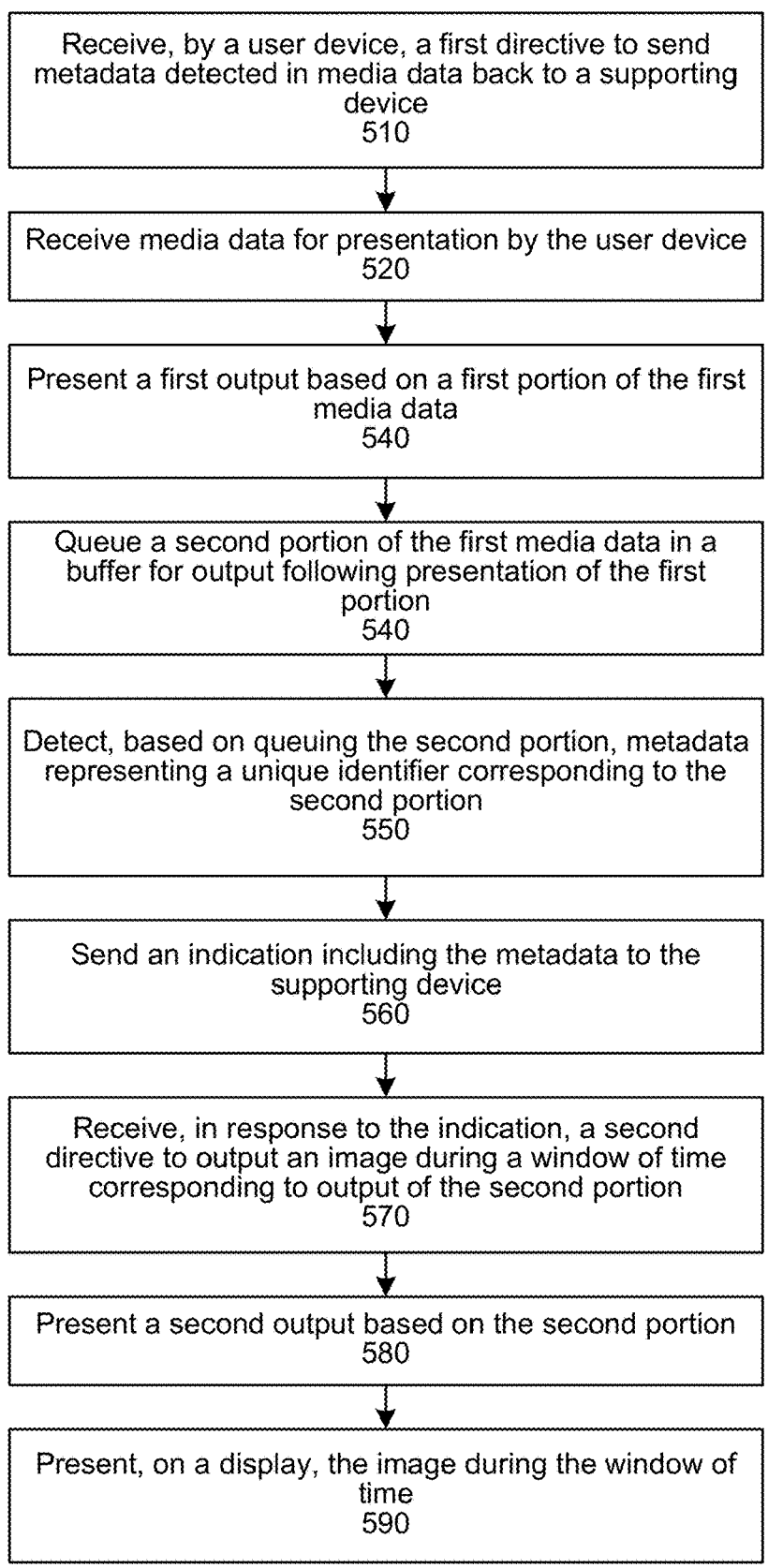
FIG. 5 is a flowchart illustrating an example method of implementing the ad marker mechanism on a device, according to embodiments of the present disclosure.

FIG. 5 is a flowchart illustrating an example method 500 of implementing the ad marker mechanism on a user device 110, according to embodiments of the present disclosure. The method 500 may be performed by the components of the system 100 previously described. For example, a user device 110 may stream requested media content from a supporting device 120. The supporting device 120 may store secondary media content for output in coordination with the requested media content. Using the ad marker mechanism, the user device 110 may send timing and identity information about output of secondary media content to the supporting device 120. The supporting device 120 may use the timing and identity information to, for example, send companion content to the user device 110 for output during presentation of the secondary media content, and/or to determine context 165 for use in processing user commands received during presentation of the secondary media content.

The method 500 may include receiving (510), by a user device 110, a first directive to send back metadata detected in media data. As described with reference to FIG. 1, the user device 110 may include a receiving buffer 142 and a playback buffer 144. The receiving buffer 142 may store a certain amount media data received from the supporting device 120 to allow for uninterrupted playback of the media data in the event of network delays, lost connections, dropped or corrupted packets, etc. The receiving buffer 142 may store, for example, several seconds, thirty second, sixty seconds, ninety seconds, etc., worth of media data to allow time for receipt of the media data to catch up following an interruption. The user device 110 may read segments of the media data from the receiving buffer 142 and queue them in a playback buffer 144 in preparation for presentation. The playback buffer 144 may store a fraction of a second, a second, or several seconds worth of media data in anticipation of playback such that playback remains uninterrupted even if the CPU and/or memory components of the user device 110 switch to different tasks during playback. When the user device 110 reads a segment of media data from the receiving buffer 142 and writes the segment to the playback buffer 144, it may detect metadata in the media data. For example, it may detect an identifier (e.g., a unique identifier corresponding to secondary media content) in the media data. In some implementations, the media data may include a watermark, such as an audio signal inaudible to a human in an audio data portion of the media data. The user device 110 may decode the watermark to determine the unique identifier corresponding to the secondary media content. In response to detecting metadata in a portion of the media data, the user device 110 may "echo" the metadata (e.g., the unique identifier) back to the supporting device 120. In some implementations, the media data may include repeated instances of the metadata appended to segments of the media data corresponding to the secondary media content. In some implementations, the user device 110 may continue sending the metadata back to the system content periodically during presentation of the secondary media content (e.g., every second or several seconds). The multiple instances of the metadata appended to segments that make up the portion of the media data corresponding to the secondary media content may facilitate functioning of the ad marker mechanism when a user pauses, rewinds, and/or fast-forwards playback during presentation of the secondary media content.

The method 500 may include receiving (520) media data for presentation by the user device. The user device 110 may receive the requested media content in response to, for example, a voice command and/or GUI input. In the case of a voice command, the user and/or supporting device may perform natural language processing to determine that the voice command represents an request to playback the media content. In response, the supporting device 120 may send media data to the user device 110 for presentation. In some implementations, the supporting device 120 may generate a manifest for the requested media content and send it to the user device 110. The manifest may represent an ordered sequence of identifiers corresponding to segments of media data corresponding to the requested media content and secondary media content selected for playback in coordination with the requested media content. The user device 110 may commence playback by requesting segments of media data associated with the identifiers in the manifest; for example, by sending a first request using the first identifier to receive a first segment of the media data, second a second request using the second identifier to receive a second segment of the media data, etc.

The supporting device 120 may select secondary media content (e.g., a notification, message, advertisement, etc.) to send to the user device 110 for playback in coordination with the requested media content. The secondary media content may represent content independent from and/or unrelated to the requested media content, such as an advertisement included in some other programming (e.g., sports content, a podcast, a news show, etc.). In such cases, the manifest may indicate playback of several successive segments of the requested media content, followed by segments of the secondary media content, and followed by further segments of the requested media content. In some cases, however, the secondary media content may precede or follow the requested media content.

The method 500 may include presenting (530) a first output based on a first portion of the first media data. The first portion of the media data may correspond to the requested media content. The user device 110 may queue the segments in the playback buffer prior to output. As the user device 110 receives segments of a second portion of the media data corresponding to the secondary media content, the method 500 may include queuing (540) the second portion in the playback buffer for output prior to the first portion. As the user device 110 reads the segments of media data corresponding to the secondary media content from the receiving buffer and writes them to the playback buffer, the user device 110 may detect (550) metadata (e.g., tags, watermarks, etc.) representing a unique identifier corresponding to the second portion. In the case of a metadata tag (e.g., in a metadata container appended to one or more segments of the media data corresponding to the secondary media content), the user device 110 may read the metadata to obtain the unique identifier. In the case of a watermark, the user device 110 may detect the watermark in the output channel (e.g., in audio data as it is queued in the playback buffer). In some implementations, the user device 110 may detect the watermark in ambient playback (e.g., using one or more microphones).

Based on the previously received directive to "echo" or send back to the supporting device 120 metadata detected in media content, the method 500 may include sending (560), by the user device 110, an indication including the metadata back to the supporting device 120. The supporting device 120 may use the metadata to retrieve additional data corresponding to the secondary media content such as companion content and/or language processing data for processing a command that refers to the secondary media content. In some implementations, the additional data may include a companion image for display and/or other companion content.

The method 500 may include receiving (570), in response to the indication, a second directive to output an image during a window of time corresponding to output of the second portion. The second directive may indicate a time window during which to present companion content (e.g., an image) from the user device 110 and/or another device. The user device 110 may, based on the second directive, update logic in a document or other file (such as an APL document) that specifies a display output.

The method 500 may include presenting (580) a second output based on the second portion of the media data. The user device 110 may generate the output using the segments of media data stored in the playback buffer. The segments of media data may have a relatively brief transit in the playback buffer; for example, a second or several seconds. Thus, the logic controlling presentation of the companion content (e.g., display of an image) may specify a time window relative to a time of detecting the metadata, the expected transit time within the playback buffer, and the duration of the secondary content item. For example, the window of time may open following the time of detection by x seconds and close y seconds after opening. During that time the user device 110 may present companion content, and after which cease presenting the companion content.

The method 500 may include presenting (590), on a display, the image during the window of time. In some implementations, the companion content may additionally specify a URL, which the user device 110 can use to make the companion image "clickable" and allow a user to select the image or a portion of the image to access a resources related to the secondary media content. In some implementations, the media data may include a second instance of the metadata and/or an indication of an end of the secondary media content. The user device 110 may, upon reading this metadata, determine (and/or signal to the supporting device 120) that output of the secondary media content has completed. In some implementations, the media data may include repeated instances of the metadata appended to segments of the media data corresponding to the secondary media content. In some implementations, the user device 110 may continue sending the metadata back to the system content periodically during presentation of the secondary media content (e.g., every second or several seconds). The multiple instances of the metadata appended to segments that make up the portion of the media data corresponding to the secondary media content may facilitate functioning of the ad marker mechanism when a user pauses, rewinds, and/or fast-forwards playback during presentation of the secondary media content. In some implementations, the user device 110 and/or the supporting device 120 may use the metadata to identify additional data corresponding to the secondary media content, such as language processing data as previously described.

Figure 6:
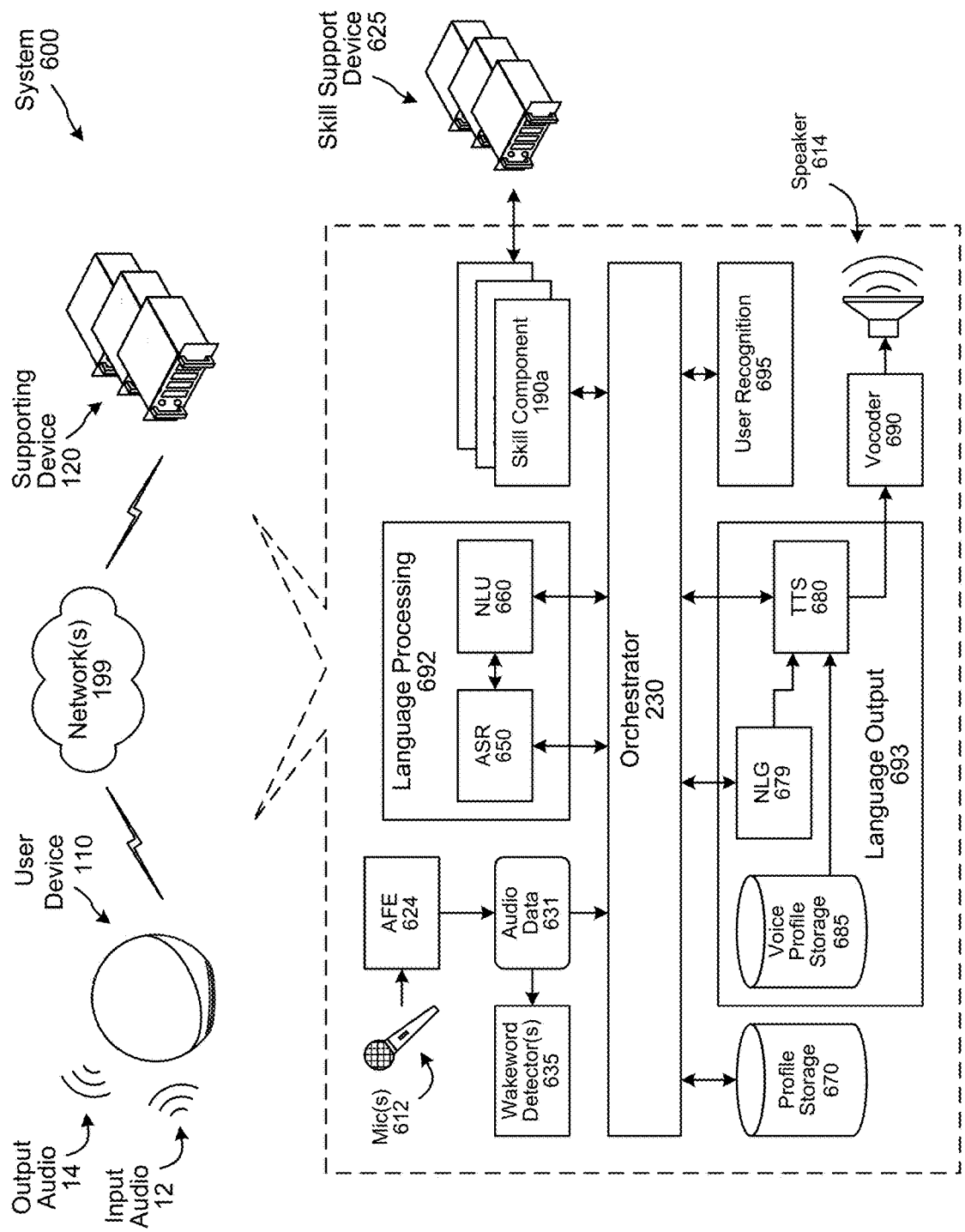
FIG. 6 is a conceptual diagram of components of the system, according to embodiments of the present disclosure.

FIG. 6 is a conceptual diagram illustrating a high level overview of example components of the system 600 including features for processing natural language commands and/or responding with synthesized speech, according to embodiments of the present disclosure. In addition to implementing the media marker mechanisms previously described, the system 600 may include components for performing speech processing and responding to natural language commands. The system 600 may include a wakeword detector 635, an orchestrator component 230, a profile storage 670, language processing components 692 including an ASR component 650 and an NLU component 660, and/or one or more skill components 190*a*, 190*b*, 190*c*, etc. (collectively "skill components 190"), which may be in communication with one or more skill support devices 625. In addition, the system 600 may include language output components 693 such as an NLG component 679, the TTS system 680, and the voice profile storage 685. The language output components 693 may also include, or be in communication with, a vocoder 690. The system 600 may provide output to a user in the form of synthesized speech, notification sounds, or other output audio 14 via one or more loudspeakers 614.

The components may reside in the user device 110 and/or supporting device 120 such that various functionality described herein may be performed by the user device 110, the supporting device 120, or may be divided or shared between the two. For example, in some cases, the user device 110 may process audio data locally, whereas in other cases the user device 110 may send audio data to the supporting device 120 for processing. In some implementations, the user device 110 may perform initial processing of audio and/or other input data, and send a form of intermittent data to the supporting device 120. The intermittent data may include ASR data (such that audio data including a user's voice need not be sent from the user's device 110), update data pertaining to various models used by the user device 110, and/or commands to skill components 190, etc.

The system 100 may include one or more microphones 612 for receiving input audio 12. The system 100 may include an acoustic front end (AFE 624), which may convert the audio data from, for example, an analog signal into a digitized signal, as described further below. In some implementations, the system 100 may include multiple AFEs 624. For example, the AFE 624 providing audio data 631 to the wakeword detector 635 may differ from the AFE 624 providing audio data to ASR and/or AED components. This may be due to the ASR and/or AED components having a different context window from the wakeword detector 635. For example, the wakeword acoustic-feature data may correspond to three seconds of audio data, while the AED acoustic-feature data may correspond to ten seconds of audio data.

The system 600 may process the audio data 631 to determine whether speech is represented therein. The system 600 may use various techniques to determine whether the input audio data 631 includes speech. In some examples, a voice-activity detector may apply voice-activity detection (VAD) techniques. Such VAD techniques may determine whether speech is present in audio data 631 based on various quantitative aspects of the input audio data 631, such as the spectral slope between one or more frames of the audio data; the energy levels of the audio data in one or more spectral bands; the signal-to-noise ratios of the audio data in one or more spectral bands; or other quantitative or qualitative aspects. In other examples, the system 600 may include a classifier configured to distinguish speech from background noise. The classifier may be implemented by techniques such as linear classifiers, support vector machines, and decision trees. In still other examples, the system 600 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 635 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources.

Another approach for wakeword detection builds HM:Ms for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 635 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the wakeword detector(s) 635 may use one of a plurality of wakeword-detection models. Each model may be trained to detect a different wakeword. In some embodiments, a single model may detect multiple wakewords. Each wakeword may be associated with a different speech-processing system and/or different speech-processing system configurations (e.g., representing different virtual assistants available to the user via the system 600). Upon detection of a particular wakeword, the system 600 may process the audio data 631 by the corresponding speech-processing system configuration.

In various embodiments, the wakeword-detection model of the wakeword detector(s) 635 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 635 may determine a similarity score for the candidate wakeword based on how similar it is to the stored wakeword; if the similarly score is higher than the wakeword-detection threshold, the wakeword detector 635 may determine that the wakeword is present in the audio data, and if the similarity score is less than the wakeword-detection threshold, the wakeword detector 635 may determine that the wakeword not is present in the audio data. For example, if the candidate wakeword matches the stored wakeword very closely, the wakeword detector 635 may determine a similarity score of 100; if the candidate wakeword does not match the stored wakeword at all, the wakeword detector 635 may determine a similarity score of 0. If the wakeword detector 635 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Once a wakeword is detected by the wakeword detector(s) 635, the system 600 may begin processing speech represented in the audio data 631. The system 600 may send the audio data 631 to an orchestrator component 230. The orchestrator component 230 may include memory and logic that enables it to transmit various pieces and forms of data to various components of the system, as well as perform other operations as described herein. The orchestrator component 230 may be or include a speech-processing system manager, which may be used to determine which, if any, of the language processing components 692, language output components 693, and/or skill components 190 should receive and/or process the audio data 631 and/or data derived therefrom (e.g., by ASR, NLU, and/or entity resolution). In some implementations, the orchestrator component 230 may determine that the audio data 631 (and/or other input representing a user command/request) relates to a certain context (e.g., an ongoing multi-turn interaction or "conversation" with the system 100, an action currently being performed by the system 100, and/or an output such as media content stream 225 currently being presented by the system 100) query the context storage 280 for the context 165 corresponding to the input. The orchestrator component 230 may provide the context 165 to, for example, an NLU component for use in selecting a domain; identifying, determining, and/or ranking intents; and/or for resolving entities implied or stated, etc. The orchestrator component 230 may use the context 165 to, for example, rank hypotheses related to the user command and/or to select a skill for handling the command. The orchestrator component 230 may provide the context 165 to, for example, a skill for use in tracking the engagement with the secondary media content 115*b*, etc.

In some embodiments, the orchestrator component 230 and/or speech-processing system manager communicate with the language processing components 692 using an application programming interface (API). The API may be used to send and/or receive data, commands, or other information to and/or from the language processing components 692. For example, the orchestrator component 230 may send, via the API, the input audio data 631 to language processing components 692 elected by the speech-processing system manager and may receive, from the selected language processing components 692, a command and/or data responsive to the audio data 631.

The language processing components 692 may include an ASR component 650, which may transcribe the input audio data 631 into text data. The text data output by the ASR component 650 may represent one or more than one (e.g., in the form of an N-best list) ASR hypotheses representing speech represented in the input audio data 631. The ASR component 650 may interpret the speech in the input audio data 631 based on a similarity between the audio data 631 and pre-established language models. For example, the ASR component 650 may compare the input audio data 631 with models for sounds (e.g., acoustic units such as phonemes, senons, phones, etc.) and sequences of sounds to identify words that match the sequence of sounds of the speech represented in the input audio data 631. The ASR component 650 may the text data generated thereby to an NLU component 660, via, in some embodiments, the orchestrator component 230. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein. The ASR component 650 is described in additional detail below with reference to FIG. 8.

Figure 9:
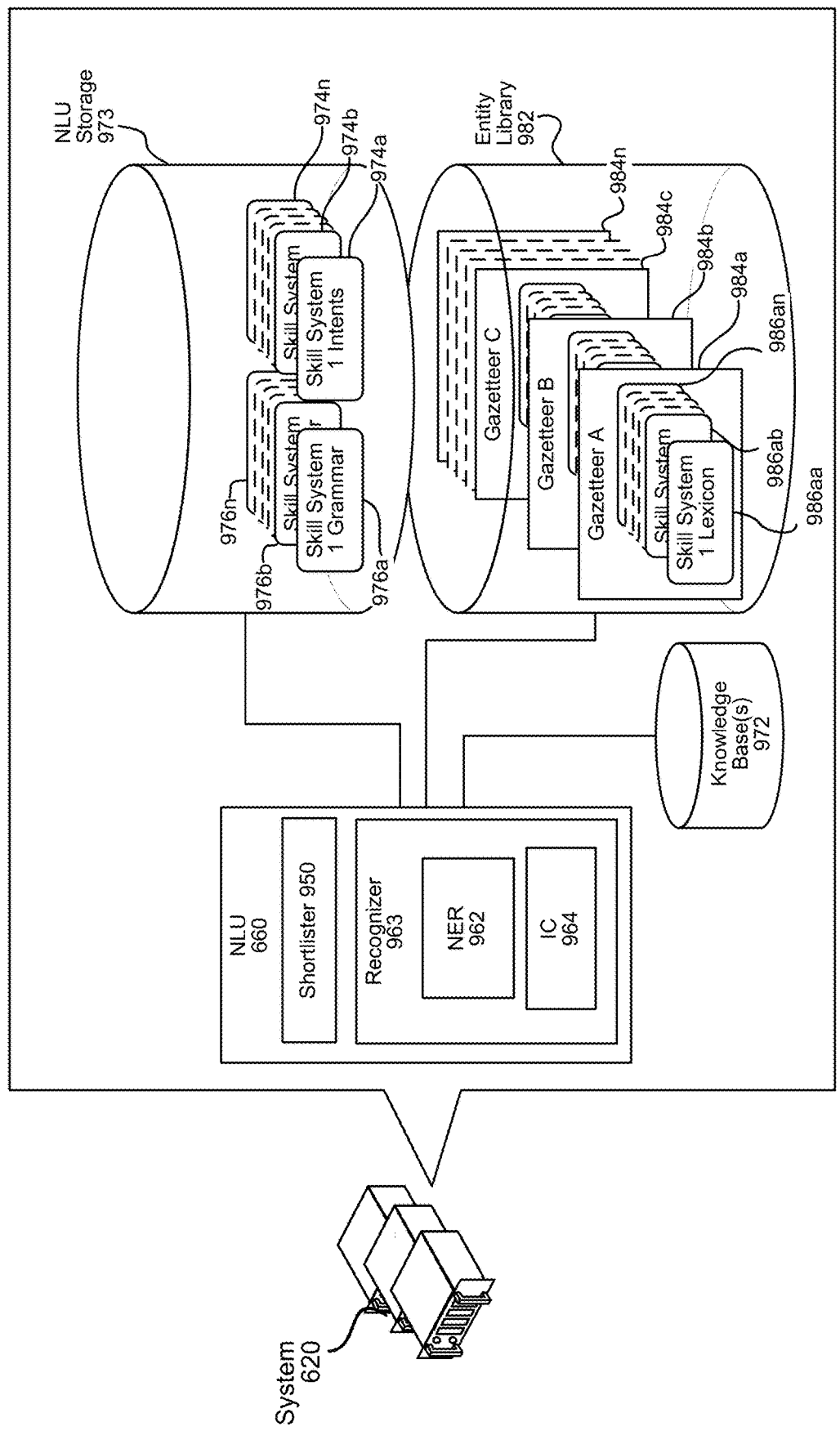
FIG. 9 is a conceptual diagram of how natural language processing is performed, according to embodiments of the present disclosure.
Figure 10:
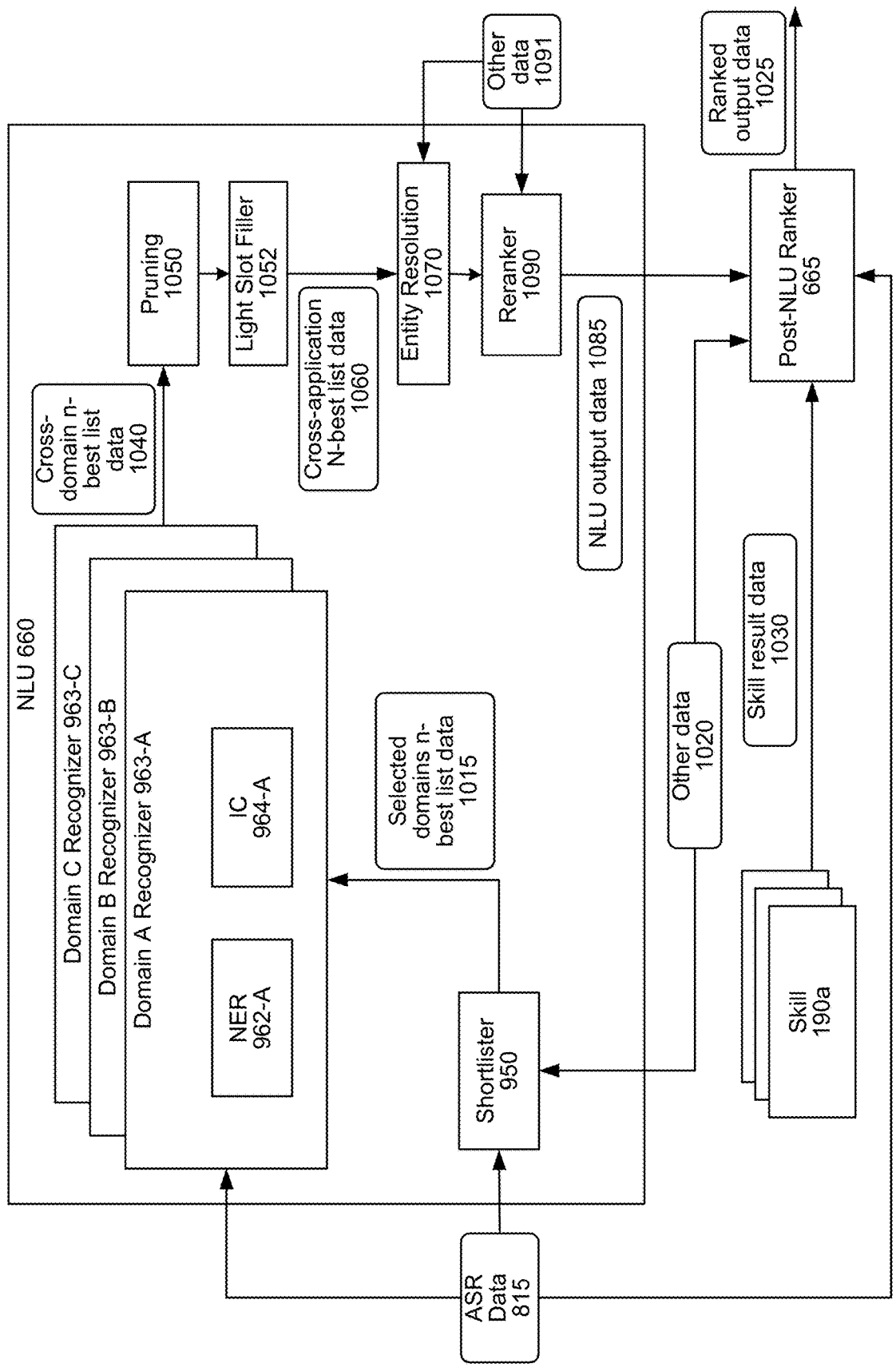
FIG. 10 is a conceptual diagram of how natural language processing is performed, according to embodiments of the present disclosure.

The language processing components 692 may further include a NLU component 660, which is shown in greater detail in FIGS. 9 and 10, that attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the user device 110, the supporting device(s) 120, a skill component 190, a skill support device(s) 625, etc.) to execute the intent. For example, if the text data corresponds to "play Africa by Toto," the NLU component 660 may determine an intent that the system output music and may identify "Toto" as an artist and "Africa" as the song. For further example, if the text data corresponds to "what is the weather," the NLU component 660 may determine an intent that the system output weather information associated with a geographic location of the user device 110. In another example, if the text data corresponds to "turn off the lights," the NLU component 660 may determine an intent that the system turn off lights associated with the user device 110 or its user.

The NLU results data may be sent (via, for example, the orchestrator component 230) from the NLU component 660 (which may include tagged text data, indicators of intent, etc.) to a skill component(s) 190. If the NLU results data includes a single NLU hypothesis, the NLU component 660 may send the NLU results data to the skill component(s) 190 associated with the NLU hypothesis. If the NLU results data includes an N-best list of NLU hypotheses, the NLU component 660 may send the top scoring NLU hypothesis to a skill component(s) 190 associated with the top scoring NLU hypothesis. In some implementations, the NLU component 660 and/or skill component 190 may determine, using the interaction score, text data representing an indication of a handoff from one set of language processing components 692 to another (e.g., corresponding to a different virtual assistant profile).

A skill component 190 may be software running on or in conjunction with the system 600 that is, or is similar to, a software application. A skill component 190 may enable the system 600 to execute specific functionality in order to provide data or produce some other requested output. The system 600 may be configured with more than one skill component 190. For example, a weather service skill component may enable the system 600 to provide weather information, a car service skill component may enable the system 600 to book a trip with respect to a taxi or ride sharing service, a restaurant skill component may enable the system 600 to order a pizza with respect to the restaurant's online ordering system, etc. A skill component 190 may operate in conjunction between the supporting device(s) 120 and other devices, such as the user device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

Skill support device(s) 625 may communicate with a skill component(s) 190 within the supporting device(s) 120 directly and/or via the orchestrator component 230. A skill support device(s) 625 may be configured to perform one or more actions. A skill may enable a skill support device(s) 625 to execute specific functionality in order to provide data or perform some other action requested by a user. For example, a weather service skill may enable a skill support device(s) 625 to provide weather information to the supporting device(s) 120, a car service skill may enable a skill support device(s) 625 to book a trip with respect to a taxi or ride sharing service, an order pizza skill may enable a skill support device(s) 625 to order a pizza with respect to a restaurant's online ordering system, an acoustic event detection (AED) skill component 190*b* may re-configure AED components, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system 600 may include a skill component 190 dedicated to interacting with the skill support device(s) 625. A skill, skill device, or skill component may include a skill component 190 operated by the system 600 and/or skill operated by the skill support device(s) 625.

The system 600 may include language output components 693 including a natural language generation component 679 and/or a TTS system 680, which was introduced in FIG. 5. The TTS system 680 may generate audio data (e.g., synthesized speech) from text data using one or more different methods. Text data input to the TTS system 680 may come from a skill component 190 (e.g., a book, news, or navigation skill), the orchestrator component 230, and/or another component of the system. The text data may include an indication of a speech-processing component and/or data responsive to a command. The TTS system 680 may retrieve a TTS model 780 from the voice profile storage 685 for generating synthesized speech having a specified speaker identity and/or voice characteristics. The TTS system 680 may output speech data (e.g., in the form of spectrograms) to the vocoder 690 for conversion to an audio signal suitable for output by the loudspeaker 614.

The system 600 may include profile storage 670. The profile storage 670 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage 670 may include one or more user profiles, with each user profile being associated with a different user identifier. Each user profile may include various user identifying information. Each user profile may also include preferences of the user and/or one or more device identifiers, representing one or more devices of the user. When a user logs into to, for example, an application installed on the user device 110, the user profile (associated with the presented login information) may be updated to include information about the user device 110. As described, the profile storage 670 may further include data that shows an interaction history of a user, including commands and times of receipt of commands. The profile storage 670 may further include data that shows when a second user was present to hear an indication of a handoff for a command uttered by a first user.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 600 may include a voice profile storage 685. The voice profile storage 685 may include a variety of information related to one or more target voices reproducible by the TTS system 680. A "voice profile" may refer to a set of data associated with a target voice, either representing a particular human speaker or wholly synthetic. The voice profile data may include speaker embedding data (e.g., representing a speaker identity), frequency data (e.g., pitch and/or timbre), and/or parameters of a TTS model 780 corresponding to a particular voice and/or voice style. In some implementations, the voice profile data may include additional information about a target voice and/or target speaker such as data regarding prosody, accent, voice energy, speaking style, and/or speaker type (e.g., sex, age, etc.). A voice profile may include a voice identifier that a user and/or component of the system 600 may use to access a particular target voice for reproduction. Thus, a skill component 190 may receive an instruction to generate a message in a certain individual's voice, and use the voice identifier to request TTS conversion of text data in the specified target voice. Upon receiving text for conversion into speech, the TTS system 680 may retrieve the identified voice profile from the voice profile storage 685, and use the retrieved voice characteristic data, TTS model 780 parameter data, etc., to generate synthetic speech that reproduces characteristics of the target voice.

Figure 11:
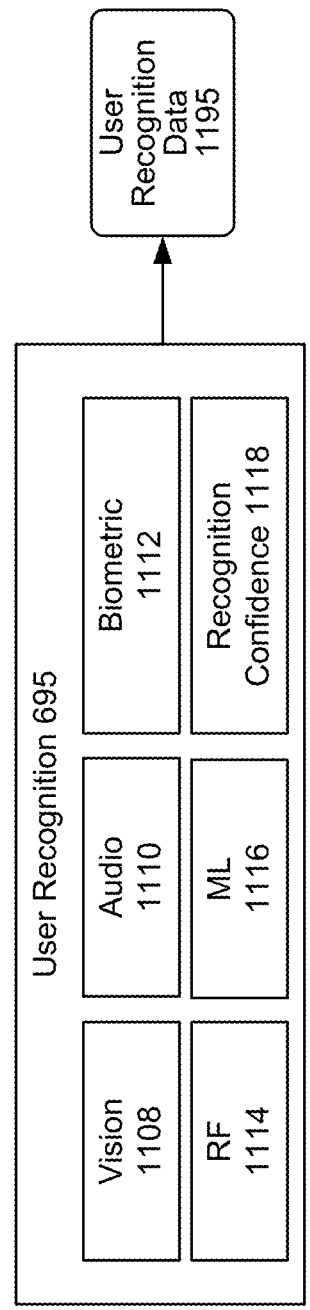
FIG. 11 is a schematic diagram of an illustrative architecture in which sensor data is combined to recognize one or more users according to embodiments of the present disclosure.

The system 600 may include a user recognition component 695 that recognizes one or more users using a variety of data, as described in greater detail below with regard to FIGS. 11-12. The user recognition component 695 may take as input the audio data 631 and/or text data output by the ASR component 650. The user recognition component 695 may perform user recognition by comparing audio characteristics in the audio data 631 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform NLU processing as well as processing performed by other components of the system.

The system 600 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 7:
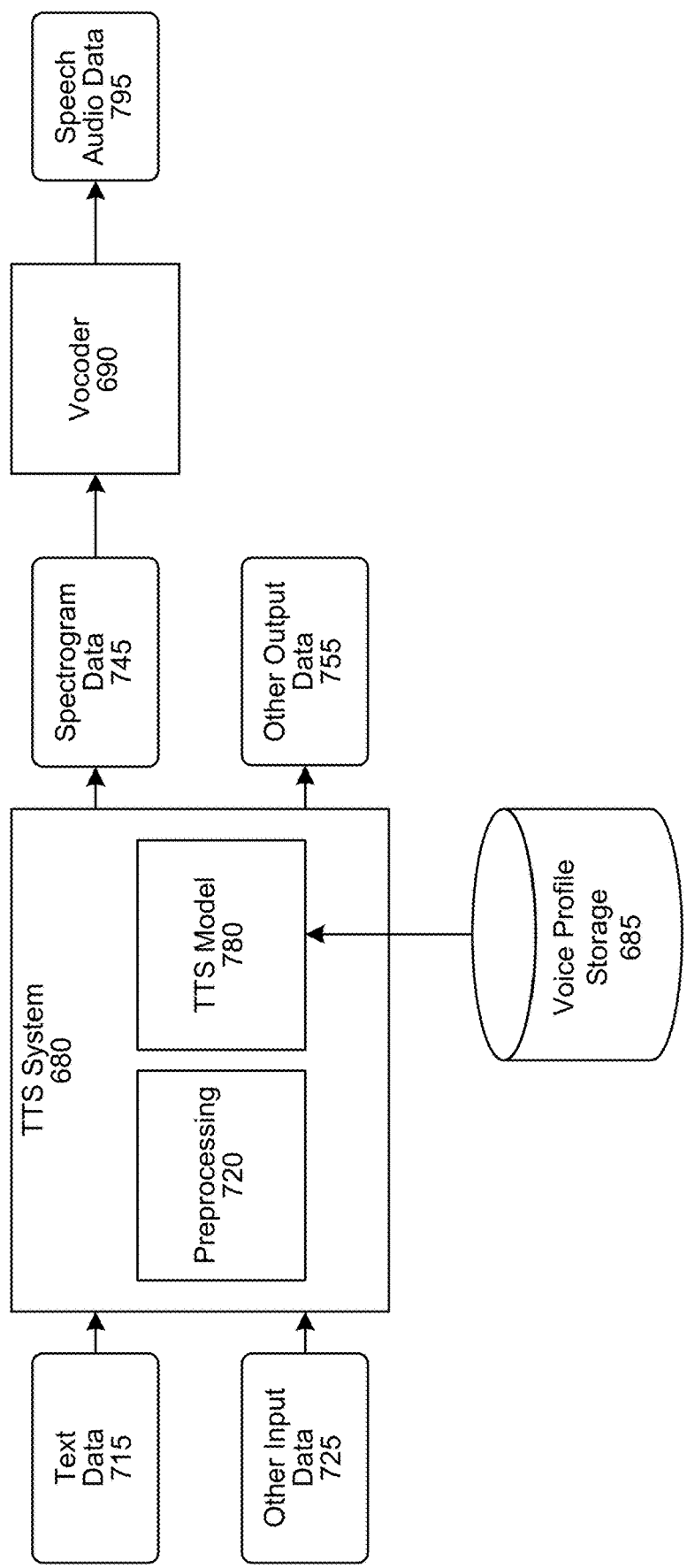
FIG. 7 is a conceptual diagram that illustrates operations for generating synthesized speech using a text-to-speech system, according to embodiments of the present disclosure.

FIG. 7 is a conceptual diagram that illustrates operations for generating synthesized speech using a TTS system 680, according to embodiments of the present disclosure. The TTS system 680 may receive text data 715 and process it using one or more TTS models 780 to generate synthesized speech in the form of spectrogram data 745. A vocoder 690 may convert the spectrogram data 745 into output speech audio data 795, which may represent a time-domain waveform suitable for amplification and output as audio (e.g., from a loudspeaker).

The TTS system 680 may additionally receive other input data 725. The other input data 725 may include, for example, identifiers and/or labels corresponding to a desired speaker identity, voice characteristics, emotion, speech style, etc. desired for the synthesized speech. In some implementations, the other input data 725 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 715 and/or the other input data 725 such as metadata accompanying a TTS request and indicating what text should be whispered (or have some other indicated audio characteristic).

The TTS system 680 may include a preprocessing component 720 that can convert the text data 715 and/or other input data 725 into a form suitable for processing by the TTS model 780. The text data 715 may be from, for example an application, a skill component (described further below), an NLG component, another device or source, or may be input by a user. The text data 715 received by the TTS system 680 may not necessarily be text, but may include other data (such as symbols, code, other data, etc.) that may reference text (such as an indicator of a word and/or phoneme) that is to be synthesized. The preprocessing component 720 may transform the text data 715 into, for example, a symbolic linguistic representation, which may include linguistic context features such as phoneme data, punctuation data, syllable-level features, word-level features, and/or emotion, speaker, accent, or other features for processing by the TTS system 680. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 715, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 720 may include functionality and/or components for performing text normalization, linguistic analysis, linguistic prosody generation, or other such operations. During text normalization, the preprocessing component 720 may first process the text data 715 and generate standard text, converting such things as numbers, abbreviations (such as Apt., St., etc.), symbols ($, %, etc.) into the equivalent of written out words.

During linguistic analysis, the preprocessing component 720 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 780 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 720 may also identify different grammatical components such as prefixes, suffixes, phrases, punctuation, syntactic boundaries, or the like. Such grammatical components may be used by the TTS system 680 to craft a natural-sounding audio waveform output. The language dictionary may also include letter-to-sound rules and other tools that may be used to pronounce previously unidentified words or letter combinations that may be encountered by the TTS system 680. Generally, the more information included in the language dictionary, the higher quality the speech output.

The output of the preprocessing component 720 may be a symbolic linguistic representation, which may include a sequence of phonetic units. In some implementations, the sequence of phonetic units may be annotated with prosodic characteristics. In some implementations, prosody may be applied in part or wholly by a TTS model 780. This symbolic linguistic representation may be sent to the TTS model 780 for conversion into audio data (e.g., in the form of Mel-spectrograms or other frequency content data format).

The TTS system 680 may retrieve one or more previously trained and/or configured TTS models 780 from the voice profile storage 685. A TTS model 780 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 780 may be stored in the voice profile storage 685. A TTS model 780 may represent a particular speaker identity and may be conditioned based on speaking style, emotion, etc. In some implementations, a particular speaker identity may be associated with more than one TTS model 780; for example, with a different model representing a different speaking style, language, emotion, etc. in some implementations, a particular TTS model 780 may be associated with more than one speaker identity; that is, be able to produce synthesized speech that reproduces voice characteristics of more than one character. In some cases, the TTS model 780 may generate the desired voice characteristics based on conditioning data received or determined from the text data 715 and/or the other input data 725.

The TTS system 680 may, based on an indication received with the text data 715 and/or other input data 725, retrieve a TTS model 780 from the voice profile storage 685 and use it to process input to generate synthesized speech. The TTS system 680 may provide the TTS model 780 with any relevant conditioning labels to generate synthesized speech having the desired voice characteristics. The TTS model 780 may generate spectrogram data 745 (e.g., frequency content data) representing the synthesized speech, and send it to the vocoder 690 for conversion into an audio signal.

The TTS system 680 may generate other output data 755. The other output data 755 may include, for example, indications or instructions for handling and/or outputting the synthesized speech. For example, the text data 715 and/or other input data 725 may be received along with metadata, such as SSML tags, indicating that a selected portion of the text data 715 should be louder or quieter. Thus, the other output data 755 may include a volume tag that instructs the vocoder 690 to increase or decrease an amplitude of the output speech audio data 795 at times corresponding to the selected portion of the text data 715. Additionally or alternatively, a volume tag may instruct a playback device to raise or lower a volume of the synthesized speech from the device's current volume level, or lower a volume of other media being output by the device (e.g., to deliver an urgent message).

The vocoder 690 may convert the spectrogram data 745 generated by the TTS model 780 into an audio signal (e.g., an analog or digital time-domain waveform) suitable for amplification and output as audio. The vocoder 690 may be, for example, a universal neural vocoder based on Parallel WaveNet or related model. The vocoder 690 may take as input audio data in the form of, for example, a Mel-spectrogram with 80 coefficients and frequencies ranging from 50 Hz to 12 kHz. The speech audio data 795 may be a time-domain audio format (e.g., pulse-code modulation (PCM), waveform audio format (WAV), μlaw, etc.) that may be readily converted to an analog signal for amplification and output by a loudspeaker, such as the loudspeaker 614 shown in FIGS. 6 and 13. The speech audio data 795 may consist of, for example, 8-, 16-, or 24-bit audio having a sample rate of 16 kHz, 24 kHz, 44.1 kHz, etc. In some implementations, other bit and/or sample rates may be used.

Figure 8:
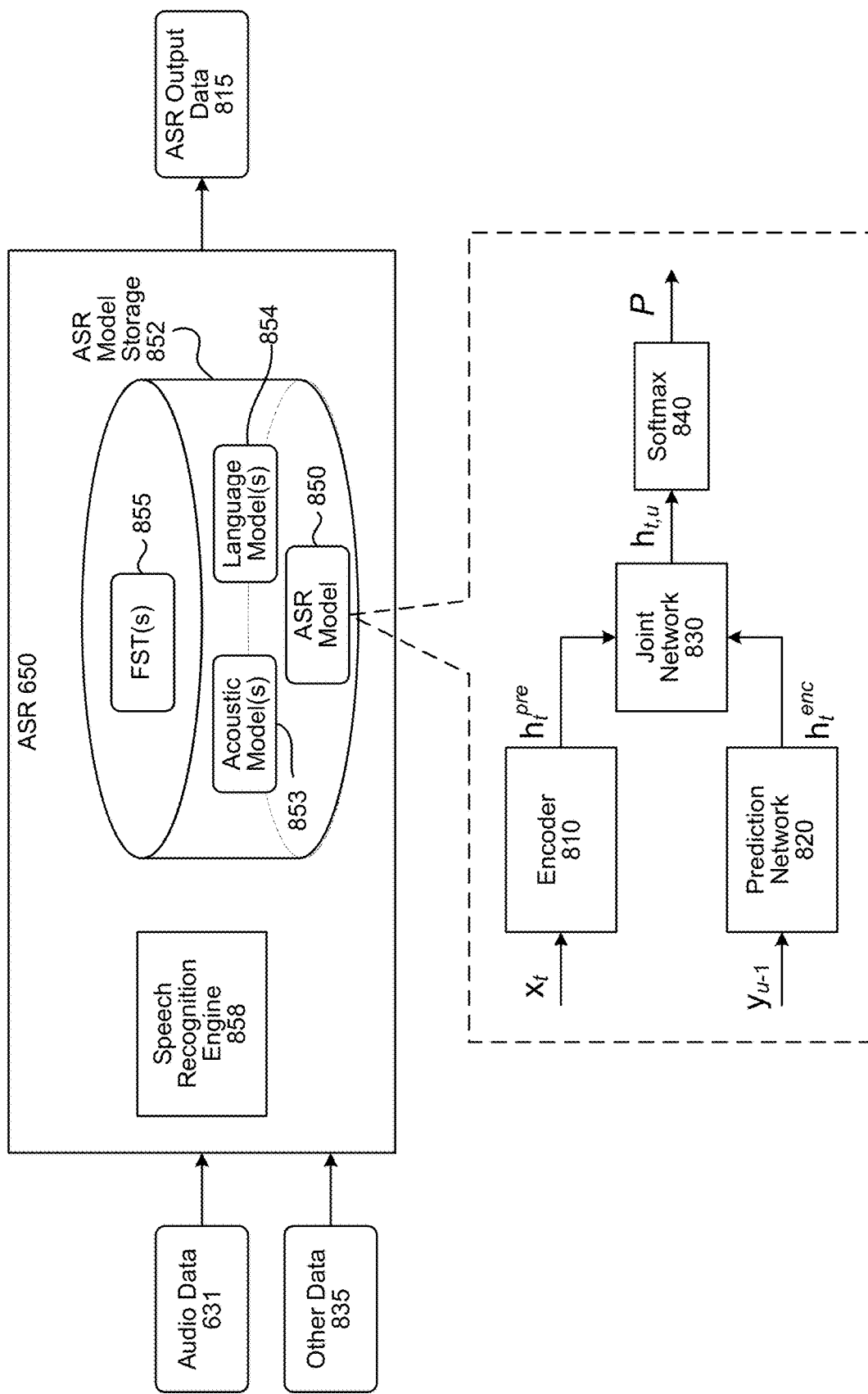
FIG. 8 is a conceptual diagram of an ASR component, according to embodiments of the present disclosure.

FIG. 8 is a conceptual diagram of an ASR component 650, according to embodiments of the present disclosure. The ASR component 650 may receive audio data 631 and process it to recognize and transcribe speech contained therein. The ASR component 650 may output the transcript as ASR output data 815. In some cases, the ASR component 650 may generate more than one ASR hypothesis (e.g., representing a possible transcript) for a single spoken natural language input. An ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, a similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). In some implementations, the ASR component 650 may receive and process other data 835. The other data 835 may include a variety of information. For example, the other data 835 may include context 165 retrieved from the context storage 280 and/or provided by the orchestrator component 230. The ASR component 650 may use the context 165 to select one or more models associated with and/or appropriate for processing audio data 631 received during or shortly after output of the secondary media content 115b by the system 100. The models may include acoustic and/or language models configured to recognize sounds and/or words related to the secondary media content 115b or a topic of the secondary media content 115b. For example, an existing ASR component 650 may not necessarily be configured to recognize an entity name, location name, specific rare word, or the like that may be associated with the secondary media content 115b. In such an instance the additional model(s) or other data corresponding to the secondary media content 115b may be used to supplement the capabilities of the existing ASR component 650 so that the ASR component 650 may be configured to recognize the entity name, location name, specific rare word, or the like. Such supplement to the capabilities of the existing ASR component 650 may be limited in duration such that after a period of time following output of the secondary media content 115b the supplementary capability may be disabled, or phased out using decay techniques depending on system configuration.

The other data 835 may include user profile information such as user recognition data for selecting a user- or group-specific model for speech processing and/or ranking hypotheses output by multiple models; for example, the ASR component 650 may use the other data 835 to select models for a particular language, dialect, accent, vernacular, etc. Based on the considered factors and the assigned confidence score, the ASR component 650 may output an ASR hypothesis that most likely matches the spoken natural language input, or may output multiple ASR hypotheses in the form of a lattice or an N-best list, with each ASR hypothesis corresponding to a respective score.

The ASR component 650 may interpret a spoken natural language input using one or more models in the ASR model storage 852. Such models may consist of NN-based end-to-end models such as the ASR model 850. Some models may process the audio data 631 based on the similarity between the spoken natural language input and acoustic units (e.g., representing subword units or phonemes) in an acoustic model 853, and use a language models 854 to predict words/phrases/sentences likely represented by sequences of the acoustic units. In some implementations, a finite state transducer (FST) 855 may perform language model functions.

The ASR component 650 may include a speech recognition engine 858. The ASR component 650 may receive audio data 631 from, for example, a microphone 612 of a user device 110. In some cases, the audio data 631 may have been processed audio detected by an AFE 624 or other component. The speech recognition engine 858 may process the audio data 631 using one or more of the ASR model 850, acoustic models 853, language models 854, FST(s) 855, and/or other data models and information for recognizing the speech conveyed in the audio data. The audio data 631 may be audio data that has been digitized (for example by the AFE 624) into frames representing time intervals for which the AFE 624 determines a number of values, called features, representing the qualities of the audio data, along with a set of those values, called a feature vector, representing the features/qualities of the audio data within the frame. In at least some embodiments, audio frames may be 10 ms each. In some embodiments, an audio frame may represent a larger window of audio; for example, –2 ms. Many different features may be determined, as known in the art, and each feature may represent some quality of the audio that may be useful for ASR processing. A number of approaches may be used by an AFE to process the audio data, such as log-filterbank energies (LFBE), Mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data 631 may arrive at the supporting device 120 encoded, in which case they may be decoded by the speech recognition engine 858 and/or prior to processing by the speech recognition engine 858.

In some implementations, the ASR component 650 may process the audio data 631 using the ASR model 850. The ASR model 850 may be, for example, a recurrent neural network such as an RNN-T. An example RNN-T architecture is illustrated in FIG. 8. The ASR model 850 may predict a probability (y|x) of labels y=($y_1$, . . . , $y_u$) given acoustic features x=($x_1$, . . . , $x_t$). During inference, the ASR model 850 can generate an N-best list using, for example, a beam search decoding algorithm. The ASR model 850 may include an encoder 810, a prediction network 820, a joint network 830, and a softmax 840. The encoder 810 may be similar or analogous to an acoustic model (e.g., similar to the acoustic model 853 described below), and may process a sequence of acoustic input features to generate encoded hidden representations. The prediction network 820 may be similar or analogous to a language model (e.g., similar to the language model 854 described below), and may process the previous output label predictions, and map them to corresponding hidden representations. The joint network 830 may be, for example, a feed forward NN that may process hidden representations from both the encoder 810 and prediction network 820, and predict output label probabilities. The softmax 840 may be a function implemented (e.g., as a layer of the joint network 830) to normalize the predicted output probabilities.

In some implementations, the speech recognition engine 858 may attempt to match received feature vectors in the audio data 631 to language acoustic units (e.g., phonemes) and words as known in the stored acoustic models 853, language models 854, and/or FST(s) 855. For example, audio data 631 may be processed by one or more acoustic model(s) 853 to determine acoustic unit data. The acoustic unit data may include indicators of acoustic units detected in the audio data 631 by the ASR component 650. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 854 (and/or using FST 855) to determine ASR output data 815. The ASR output data 815 can include one or more hypotheses. One or more of the hypotheses represented in the ASR output data 815 may then be sent to further components (such as the NLU component 660) for further processing as discussed herein. The ASR output data 815 may include representations of text of an utterance, such as words, subword units, or the like.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 650 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 650 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 650 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

FIGS. 9 and 10 illustrates how the NLU component 660 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 660 may process text data including several ASR hypotheses of a single user input. For example, if the ASR component 650 outputs text data including an n-best list of ASR hypotheses, the NLU component 660 may process the text data with respect to all (or a portion of) the ASR hypotheses represented therein.

The NLU component 660 may annotate text data by parsing and/or tagging the text data. For example, for the text data "tell me the weather for Seattle," the NLU component 660 may tag "tell me the weather for Seattle" as an <OutputWeather> intent as well as separately tag "Seattle" as a location for the weather information.

The NLU component 660 may include a shortlister component 950. The shortlister component 950 selects skills that may execute with respect to ASR output data 815 input to the NLU component 660 (e.g., applications that may execute with respect to the user input). The ASR output data 815 (which may also be referred to as ASR data 815) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 660 may process ASR output data 815 input thereto with respect to every skill of the system, either in parallel, in series, or using some combination thereof. By implementing a shortlister component 950, the NLU component 660 may process ASR output data 815 with respect to only the skills that may execute with respect to the user input. This reduces total compute power and latency attributed to NLU processing.

The shortlister component 950 may include one or more trained models. The model(s) may be trained to recognize various forms of user inputs that may be received by the supporting device(s) 120. For example, during a training period skill support device(s) 625 associated with a skill may provide the supporting device(s) 120 with training text data representing sample user inputs that may be provided by a user to invoke the skill. For example, for a ride sharing skill, a skill support device(s) 625 associated with the ride sharing skill may provide the supporting device(s) 120 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the supporting device(s) 120 may solicit the skill support device (s) 625 associated with the skill regarding whether the determined other user input structures are permissible, from the perspective of the skill support device(s) 625, to be used to invoke the skill. The alternate user input structures may be derived by one or more trained models during model training and/or may be based on user input structures provided by different skills. The skill support device(s) 625 associated with a particular skill may also provide the supporting device(s) 120 with training text data indicating grammar and annotations. The supporting device(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The supporting device(s) 120 may use the sample user inputs provided by a skill support device(s) 625, and related sample user inputs potentially determined during training, as binary examples to train a model associated with a skill associated with the skill support device(s) 625. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 815 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 660 may include one or more recognizers 963. In at least some embodiments, a recognizer 963 may be associated with a skill support device 625 (e.g., the recognizer may be configured to interpret text data to correspond to the skill support device 625). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 815 is potentially associated with multiple domains, the recognizers 963 associated with the domains may process the ASR output data 815, while recognizers 963 not indicated in the shortlister component 950's output may not process the ASR output data 815. The "shortlisted" recognizers 963 may process the ASR output data 815 in parallel, in series, partially in parallel, etc. For example, if ASR output data 815 potentially relates to both a communications domain and a music domain, a recognizer associated with the communications domain may process the ASR output data 815 in parallel, or partially in parallel, with a recognizer associated with the music domain processing the ASR output data 815.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 660) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or user device 110. For example, a Gazetteer A (984*a*) includes skill-indexed lexical information 986*aa* to 986*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data) that may be useful for later processing. The NER component 962 may also label each slot with a type (e.g., noun, place, city, artist name, song name, etc.).

Each grammar database 976 includes the names of entities (i.e., nouns) commonly found in speech about the particular domain to which the grammar database 976 relates, whereas the lexical information 986 is personalized to the user and/or the user device 110 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 660 may utilize gazetteer information (984*a*-984*n*) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent}<PlayMusic>, {artist name} rolling stones, {media type} SONG, and {song title} mother's little helper. For further example, the NER component 962 may tag "play songs by the rolling stones" as: {domain} Music, {intent}<PlayMusic>, {artist name} rolling stones, and {media type} SONG.

The shortlister component 950 may receive ASR output data 815 output from the ASR component 650 or output from the user device 110 (as illustrated in FIG. 10). The ASR component 650 may embed the ASR output data 815 into a form processable by a trained model(s) using sentence embedding techniques as known in the art. Sentence embedding results in the ASR output data 815 including text in a structure that enables the trained models of the shortlister component 950 to operate on the ASR output data 815. For example, an embedding of the ASR output data 815 may be a vector representation of the ASR output data 815.

The shortlister component 950 may make binary determinations (e.g., yes or no) regarding which domains relate to the ASR output data 815. The shortlister component 950 may make such determinations using the one or more trained models described herein above. If the shortlister component 950 implements a single trained model for each domain, the shortlister component 950 may simply run the models that are associated with enabled domains as indicated in a user profile associated with the user device 110 and/or user that originated the user input.

The shortlister component 950 may generate n-best list data 1015 representing domains that may execute with respect to the user input represented in the ASR output data 815. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 815. In another example, instead of indicating every domain of the system, the n-best list data 1015 may only indicate the domains that are likely to be able to execute the user input represented in the ASR output data 815. In yet another example, the shortlister component 950 may implement thresholding such that the n-best list data 1015 may indicate no more than a maximum number of domains that may execute the user input represented in the ASR output data 815. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 815 by the shortlister component 950 relative to such domains) are included in the n-best list data 1015.

The ASR output data 815 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 815.

As indicated above, the shortlister component 950 may implement thresholding such that an n-best list output therefrom may include no more than a threshold number of entries. If the ASR output data 815 includes more than one ASR hypothesis, the n-best list output by the shortlister component 950 may include no more than a threshold number of entries irrespective of the number of ASR hypotheses output by the ASR component 650. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 815, the shortlister component 950 may generate confidence scores representing likelihoods that domains relate to the ASR output data 815. If the shortlister component 950 implements a different trained model for each domain, the shortlister component 950 may generate a different confidence score for each individual domain trained model that is run. If the shortlister component 950 runs the models of every domain when ASR output data 815 is received, the shortlister component 950 may generate a different confidence score for each domain of the system. If the shortlister component 950 runs the models of only the domains that are associated with skills indicated as enabled in a user profile associated with the user device 110 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 815.

N-best list data 1015 including confidence scores that may be output by the shortlister component 950 may be represented as, for example:

Search domain, 0.67
Recipe domain, 0.62
Information domain, 0.57
Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 815 as well as respective confidence scores. The other data 1020 may include a variety of information. For example, the other data 1020 may include context 165 retrieved from the context storage 280 and/or provided by the orchestrator component 230. The context 165 may include language processing data such as one or more domains, intents, skills, and/or named entities associated with secondary media content 115b currently (or recently) output by the system 100. The context 165 may allow the shortlister component 950 to select from a plurality of candidate domains and/or rank candidate domains for processing the command. The other data 1020 may include usage history data associated with the user device 110 and/or user that originated the user input. For example, a confidence score of a domain may be increased if user inputs originated by the user device 110 and/or user routinely invoke the domain. Conversely, a confidence score of a domain may be decreased if user inputs originated by the user device 110 and/or user rarely invoke the domain. Thus, the other data 1020 may include an indicator of the user associated with the ASR output data 815, for example as determined by the user recognition component 695.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the user device 110 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 670. When the shortlister component 950 receives the ASR output data 815, the shortlister component 950 may determine whether profile data associated with the user and/or user device 110 that originated the command includes an indication of enabled skills.

The other data 1020 may also include data indicating the type of the user device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the user device 110 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the user device 110 that originated the user input corresponding to the ASR output data 815. For example, if the user device 110 is a displayless device, the shortlister component 950 may increase the confidence score associated with the domain that generates audio data while leaving the confidence score associated with the domain that generates video data the same. Alternatively, if the user device 110 is a displayless device, the shortlister component 950 may leave the confidence score associated with the domain that generates audio data the same while decreasing the confidence score associated with the domain that generates video data. Moreover, if the user device 110 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the supporting device(s) 120 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list 1015 unless the shortlister component 950 is one hundred percent confident that the domain may not execute the user input represented in the ASR output data 815 (e.g., the shortlister component 950 determines a confidence score of zero for the domain).

The shortlister component 950 may send the ASR output data 815 to recognizers 963 associated with domains represented in the n-best list data 1015. Alternatively, the shortlister component 950 may send the n-best list data 1015 or some other indicator of the selected subset of domains to another component (such as the orchestrator component 230) which may in turn send the ASR output data 815 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 230 may send the ASR output data 815 to recognizers 963 associated with domains that the shortlister component 950 determines may execute the user input. If the shortlister component 950 generates an n-best list representing domains with associated confidence scores, the shortlister component 950/orchestrator component 230 may send the ASR output data 815 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 660 may compile the output tagged text data of the recognizers 963 into a single cross-domain n-best list 1040 and may send the cross-domain n-best list 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

[0.95] Intent: <PlayMusic> ArtistName: Beethoven SongName: Waldstein Sonata
[0.70] Intent: <PlayVideo> ArtistName: Beethoven VideoName: Waldstein Sonata
[0.01] Intent: <PlayMusic> ArtistName: Beethoven AlbumName: Waldstein Sonata
[0.01] Intent: <PlayMusic> SongName: Waldstein Sonata The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 660 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972. The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list 1060 but that includes more detailed information (e.g., entity IDs) about the specific entities mentioned in the slots and/or more detailed slot data that can eventually be used by a skill. The NLU component 660 may include multiple entity resolution components 1070 and each entity resolution component 1070 may be specific to one or more domains. The entity resolution component 1070 may consider may also consider other data 1091. The other data 1091 may include a variety of information. For example, the other data 1091 may include context 165 retrieved from the context storage 280 and/or provided by the orchestrator component 230. The context 165 may include language processing data that may specify one or more named entities associated with secondary media content 115*b* currently (or recently) output by the system 100. The context 165 may allow the entity resolution component 1070 to select from a plurality of candidate named entities and/or identify a named entity when the speech or text being processed did not state the entity explicitly.

The NLU component 660 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include context 165 retrieved from the context storage 280 and/or provided by the orchestrator component 230. In another example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of user device 110, user identifier, context, as well as other information. For example, the reranker 1090 may consider when any particular skill is currently active (e.g., music being played, a game being played, etc.).

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 660 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 660 may perform NLU processing described above with respect to domains associated with skills wholly implemented as part of the supporting device (s) 120 (e.g., designated 190 in FIG. 6). The NLU component 660 may separately perform NLU processing described above with respect to domains associated with skills that are at least partially implemented as part of the skill support device(s) 625. In an example, the shortlister component 950 may only process with respect to these latter domains. Results of these two NLU processing paths may be merged into NLU output data 1085, which may be sent to a post-NLU ranker 665, which may be implemented by the supporting device(s) 120.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU results data 1085, skill result data 1030, and the other data 1020 in order to output ranked output data 1025. The other data 1020 may include, for example, the context 165 retrieved from the context storage 280 and/or provided by the orchestrator component 230. The context 165 may specify one or more domains, intents, and/or named entities associated with secondary media content 115b currently (or recently) output by the system 100. The context 165 may allow the post-NLU ranker 665 to select from and/or rerank a plurality of hypotheses in the NLU results data 1085 to, for example, prioritize hypotheses corresponding and/or relevant to secondary media content output by the system 100. The ranked output data 1025 may include an n-best list where the NLU hypotheses in the NLU results data 1085 are reordered such that the n-best list in the ranked output data 1025 represents a prioritized list of skills to respond to a user input as determined by the post-NLU ranker 665. The ranked output data 1025 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU results data 1085 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 230) may solicit the first skill and the second skill to provide potential result data 1030 based on the first NLU hypothesis and the second NLU hypothesis, respectively. For example, the post-NLU ranker 665 may send the first NLU hypothesis to the first skill 190a along with a request for the first skill 190a to at least partially execute with respect to the first NLU hypothesis. The post-NLU ranker 665 may also send the second NLU hypothesis to the second skill 190b along with a request for the second skill 190b to at least partially execute with respect to the second NLU hypothesis. The post-NLU ranker 665 receives, from the first skill 190a, first result data 1030a generated from the first skill 190a's execution with respect to the first NLU hypothesis. The post-NLU ranker 665 also receives, from the second skill 190b, second results data 1030b generated from the second skill 190b's execution with respect to the second NLU hypothesis.

The result data 1030 may include various portions. For example, the result data 1030 may include content (e.g., audio data, text data, and/or video data) to be output to a user. The result data 1030 may also include a unique identifier used by the supporting device(s) 120 and/or the skill support device(s) 625 to locate the data to be output to a user. The result data 1030 may also include an instruction. For example, if the user input corresponds to "turn on the light," the result data 1030 may include an instruction causing the system to turn on a light associated with a profile of the user device 110 and/or user.

The post-NLU ranker 665 may consider the first result data 1030a and the second result data 1030b to alter the first confidence score and the second confidence score of the first NLU hypothesis and the second NLU hypothesis, respectively. That is, the post-NLU ranker 665 may generate a third confidence score based on the first result data 1030a and the first confidence score. The third confidence score may correspond to how likely the post-NLU ranker 665 determines the first skill will correctly respond to the user input. The post-NLU ranker 665 may also generate a fourth confidence score based on the second result data 1030b and the second confidence score. One skilled in the art will appreciate that a first difference between the third confidence score and the fourth confidence score may be greater than a second difference between the first confidence score and the second confidence score. The post-NLU ranker 665 may also consider the other data 1020 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 1030 associated with the skill 190 with the highest altered confidence score to be the data output in response to the current user input. The post-NLU ranker 665 may also consider the ASR output data 815 to alter the NLU hypotheses confidence scores.

The orchestrator component 230 may, prior to sending the NLU results data 1085 to the post-NLU ranker 665, associate intents in the NLU hypotheses with skills 190. For example, if a NLU hypothesis includes a <PlayMusic> intent, the orchestrator component 230 may associate the NLU hypothesis with one or more skills 190 that can execute the <PlayMusic> intent. Thus, the orchestrator component 230 may send the NLU results data 1085, including NLU hypotheses paired with skills 190, to the post-NLU ranker 665. In response to ASR output data 815 corresponding to "what should I do for dinner today," the orchestrator component 230 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 665 queries each skill 190, paired with a NLU hypothesis in the NLU output data 1085, to provide result data 1030 based on the NLU hypothesis with which it is associated. That is, with respect to each skill, the post-NLU ranker 665 colloquially asks the each skill "if given this NLU hypothesis, what would you do with it." According to the above example, the post-NLU ranker 665 may send skills 190 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 665 may query each of the skills 190 in parallel or substantially in parallel.

A skill 190 may provide the post-NLU ranker 665 with various data and indications in response to the post-NLU ranker 665 soliciting the skill 190 for result data 1030. A skill 190 may simply provide the post-NLU ranker 665 with an indication of whether or not the skill can execute with respect to the NLU hypothesis it received. A skill 190 may also or alternatively provide the post-NLU ranker 665 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 665 with result data 1030 indicating slots of a framework that the skill 190 further needs filled or entities that the skill 190 further needs resolved prior to the skill 190 being able to provided result data 1030 responsive to the user input. The skill 190 may also provide the post-NLU ranker 665 with an instruction and/or computer-generated speech indicating how the skill 190 recommends the system solicit further information needed by the skill 190. The skill 190 may further provide the post-NLU ranker 665 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 665 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1030 includes an indication provided by a skill 190 indicating whether or not the skill 190 can execute with respect to a NLU hypothesis; data generated by a skill 190 based on a NLU hypothesis; as well as an indication provided by a skill 190 indicating the skill 190 needs further information in addition to what is represented in the received NLU hypothesis.

The post-NLU ranker 665 uses the result data 1030 provided by the skills 190 to alter the NLU processing confidence scores generated by the reranker 1090. That is, the post-NLU ranker 665 uses the result data 1030 provided by the queried skills 190 to create larger differences between the NLU processing confidence scores generated by the reranker 1090. Without the post-NLU ranker 665, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 190 that provide result data 1030 responsive to NLU hypotheses over skills 190 that provide result data 1030 corresponding to an indication that further information is needed, as well as skills 190 that provide result data 1030 indicating they can provide multiple responses to received NLU hypotheses. For example, the post-NLU ranker 665 may generate a first score for a first skill 190a that is greater than the first skill's NLU confidence score based on the first skill 190a providing result data 1030a including a response to a NLU hypothesis. For further example, the post-NLU ranker 665 may generate a second score for a second skill 190b that is less than the second skill's NLU confidence score based on the second skill 190b providing result data 1030b indicating further information is needed for the second skill 190b to provide a response to a NLU hypothesis. Yet further, for example, the post-NLU ranker 665 may generate a third score for a third skill 190c that is less than the third skill's NLU confidence score based on the third skill 190c providing result data 1030c indicating the third skill 190c can provide multiple responses to a NLU hypothesis.

The post-NLU ranker 665 may consider other data 1020 in determining scores. The other data 1020 may include rankings associated with the queried skills 190. A ranking may be a system ranking or a user-specific ranking. A ranking may indicate a veracity of a skill from the perspective of one or more users of the system. For example, the post-NLU ranker 665 may generate a first score for a first skill 190a that is greater than the first skill's NLU processing confidence score based on the first skill 190a being associated with a high ranking. For further example, the post-NLU ranker 665 may generate a second score for a second skill 190b that is less than the second skill's NLU processing confidence score based on the second skill 190b being associated with a low ranking.

The other data 1020 may include information indicating whether or not the user that originated the user input has enabled one or more of the queried skills 190. For example, the post-NLU ranker 665 may generate a first score for a first skill 190a that is greater than the first skill's NLU processing confidence score based on the first skill 190a being enabled by the user that originated the user input. For further example, the post-NLU ranker 665 may generate a second score for a second skill 190b that is less than the second skill's NLU processing confidence score based on the second skill 190b not being enabled by the user that originated the user input. When the post-NLU ranker 665 receives the NLU results data 1085, the post-NLU ranker 665 may determine whether profile data, associated with the user and/or device that originated the user input, includes indications of enabled skills.

The other data 1020 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 1020 may include information indicating the veracity of the result data 1030 provided by a skill 190. For example, if a user says "tell me a recipe for pasta sauce," a first skill 190a may provide the post-NLU ranker 665 with first result data 1030a corresponding to a first recipe associated with a five star rating and a second skill 190b may provide the post-NLU ranker 665 with second result data 1030b corresponding to a second recipe associated with a one star rating. In this situation, the post-NLU ranker 665 may increase the NLU processing confidence score associated with the first skill 190a based on the first skill 190a providing the first result data 1030a associated with the five star rating and/or decrease the NLU processing confidence score associated with the second skill 190b based on the second skill 190b providing the second result data 1030b associated with the one star rating.

The other data 1020 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 190a corresponding to a room service skill associated with the hotel and/or decrease the NLU processing confidence score associated with a second skill 190b corresponding to a food skill not associated with the hotel.

The other data 1020 may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the post-NLU ranker 665 may increase the NLU processing confidence score associated with the first skill 190a and/or decrease the NLU processing confidence score associated with the second skill 190b. Likewise, if the device and/or user that originated the user input is located in Boston, Massachusetts, the post-NLU ranker 665 may increase the NLU processing confidence score associated with the second skill 190b and/or decrease the NLU processing confidence score associated with the first skill 190a.

The other data 1020 may include information indicating a time of day. The system may be configured with skills 190 that operate with respect to certain times of day. For example, a user may provide a user input corresponding to "order me food." A first skill 190a may generate first result data 1030a corresponding to breakfast. A second skill 190b may generate second result data 1030b corresponding to dinner. If the supporting device(s) 120 receives the user input in the morning, the post-NLU ranker 665 may increase the NLU processing confidence score associated with the first skill 190a and/or decrease the NLU processing score associated with the second skill 190b. If the supporting device(s) 120 receives the user input in the afternoon or evening, the post-NLU ranker 665 may increase the NLU processing confidence score associated with the second skill 190b and/or decrease the NLU processing confidence score associated with the first skill 190a.

The other data 1020 may include information indicating user preferences. The system may include multiple skills 190 configured to execute in substantially the same manner. For example, a first skill 190a and a second skill 190b may both be configured to order food from respective restaurants. The system may store a user preference (e.g., in the profile storage 670) that is associated with the user that provided the user input to the supporting device(s) 120 as well as indicates the user prefers the first skill 190a over the second skill 190b. Thus, when the user provides a user input that may be executed by both the first skill 190a and the second skill 190b, the post-NLU ranker 665 may increase the NLU processing confidence score associated with the first skill 190a and/or decrease the NLU processing confidence score associated with the second skill 190b.

The other data 1020 may include information indicating system usage history associated with the user that originated the user input. For example, the system usage history may indicate the user originates user inputs that invoke a first skill 190a more often than the user originates user inputs that invoke a second skill 190b. Based on this, if the present user input may be executed by both the first skill 190a and the second skill 190b, the post-NLU ranker 665 may increase the NLU processing confidence score associated with the first skill 190a and/or decrease the NLU processing confidence score associated with the second skill 190b.

The other data 1020 may include information indicating a speed at which the user device 110 that originated the user input is traveling. For example, the user device 110 may be located in a moving vehicle, or may be a moving vehicle. When a user device 110 is in motion, the system may prefer audio outputs rather than visual outputs to decrease the likelihood of distracting the user (e.g., a driver of a vehicle). Thus, for example, if the user device 110 that originated the user input is moving at or above a threshold speed (e.g., a speed above an average user's walking speed), the post-NLU ranker 665 may increase the NLU processing confidence score associated with a first skill 190a that generates audio data. The post-NLU ranker 665 may also or alternatively decrease the NLU processing confidence score associated with a second skill 190b that generates image data or video data.

The other data 1020 may include information indicating how long it took a skill 190 to provide result data 1030 to the post-NLU ranker 665. When the post-NLU ranker 665 multiple skills 190 for result data 1030, the skills 190 may respond to the queries at different speeds. The post-NLU ranker 665 may implement a latency budget. For example, if the post-NLU ranker 665 determines a skill 190 responds to the post-NLU ranker 665 within a threshold amount of time from receiving a query from the post-NLU ranker 665, the post-NLU ranker 665 may increase the NLU processing confidence score associated with the skill 190. Conversely, if the post-NLU ranker 665 determines a skill 190 does not respond to the post-NLU ranker 665 within a threshold amount of time from receiving a query from the post-NLU ranker 665, the post-NLU ranker 665 may decrease the NLU processing confidence score associated with the skill 190.

It has been described that the post-NLU ranker 665 uses the other data 1020 to increase and decrease NLU processing confidence scores associated with various skills 190 that the post-NLU ranker 665 has already requested result data from. Alternatively, the post-NLU ranker 665 may use the other data 1020 to determine which skills 190 to request result data from. For example, the post-NLU ranker 665 may use the other data 1020 to increase and/or decrease NLU processing confidence scores associated with skills 190 associated with the NLU results data 1085 output by the NLU component 660. The post-NLU ranker 665 may select n-number of top scoring altered NLU processing confidence scores. The post-NLU ranker 665 may then request result data 1030 from only the skills 190 associated with the selected n-number of NLU processing confidence scores.

As described, the post-NLU ranker 665 may request result data 1030 from all skills 190 associated with the NLU results data 1085 output by the NLU component 660. Alternatively, the supporting device(s) 120 may prefer result data 1030 from skills implemented entirely by the supporting device(s) 120 rather than skills at least partially implemented by the skill support device(s) 625. Therefore, in the first instance, the post-NLU ranker 665 may request result data 1030 from only skills associated with the NLU results data 1085 and entirely implemented by the supporting device(s) 120. The post-NLU ranker 665 may only request result data 1030 from skills associated with the NLU results data 1085, and at least partially implemented by the skill support device(s) 625, if none of the skills, wholly implemented by the supporting device(s) 120, provide the post-NLU ranker 665 with result data 1030 indicating either data response to the NLU results data 1085, an indication that the skill can execute the user input, or an indication that further information is needed.

As indicated above, the post-NLU ranker 665 may request result data 1030 from multiple skills 190. If one of the skills 190 provides result data 1030 indicating a response to a NLU hypothesis and the other skills provide result data 1030 indicating either they cannot execute or they need further information, the post-NLU ranker 665 may select the result data 1030 including the response to the NLU hypothesis as the data to be output to the user. If more than one of the skills 190 provides result data 1030 indicating responses to NLU hypotheses, the post-NLU ranker 665 may consider the other data 1020 to generate altered NLU processing confidence scores, and select the result data 1030 of the skill associated with the greatest score as the data to be output to the user.

A system that does not implement the post-NLU ranker 665 may select the highest scored NLU hypothesis in the NLU results data 1085. The system may send the NLU hypothesis to a skill 190 associated therewith along with a request for output data. In some situations, the skill 190 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU results data 1085 to provide result data 1030 to the post-NLU ranker 665 prior to the post-NLU ranker 665 ultimately determining the skill 190 to be invoked to respond to the user input. Some of the skills 190 may provide result data 1030 indicating responses to NLU hypotheses while other skills 190 may providing result data 1030 indicating the skills cannot provide responsive data. Whereas a system not implementing the post-NLU ranker 665 may select one of the skills 190 that could not provide a response, the post-NLU ranker 665 only selects a skill 190 that provides the post-NLU ranker 665 with result data corresponding to a response, indicating further information is needed, or indicating multiple responses can be generated.

The post-NLU ranker 665 may select result data 1030, associated with the skill 190 associated with the highest score, for output to the user. Alternatively, the post-NLU ranker 665 may output ranked output data 1025 indicating skills 190 and their respective post-NLU ranker rankings. Since the post-NLU ranker 665 receives result data 1030, potentially corresponding to a response to the user input, from the skills 190 prior to post-NLU ranker 665 selecting one of the skills or outputting the ranked output data 1025, little to no latency occurs from the time skills provide result data 1030 and the time the system outputs responds to the user.

If the post-NLU ranker 665 selects result audio data to be output to a user and the system determines content should be output audibly, the post-NLU ranker 665 (or another component of the supporting device(s) 120) may cause the user device 110 to output audio corresponding to the result audio data. If the post-NLU ranker 665 selects result text data to output to a user and the system determines content should be output visually, the post-NLU ranker 665 (or another component of the supporting device(s) 120) may cause the user device 110 to display text corresponding to the result text data. If the post-NLU ranker 665 selects result audio data to output to a user and the system determines content should be output visually, the post-NLU ranker 665 (or another component of the supporting device(s) 120) may send the result audio data to the ASR component 650. The ASR component 650 may generate output text data corresponding to the result audio data. The supporting device(s) 120 may then cause the user device 110 to display text corresponding to the output text data. If the post-NLU ranker 665 selects result text data to output to a user and the system determines content should be output audibly, the post-NLU ranker 665 (or another component of the supporting device(s) 120) may send the result text data to the TTS system 680. The TTS system 680 may generate output audio data (corresponding to computer-generated speech) based on the result text data. The supporting device(s) 120 may then cause the user device 110 to output audio corresponding to the output audio data.

As described, a skill 190 may provide result data 1030 either indicating a response to the user input, indicating more information is needed for the skill 190 to provide a response to the user input, or indicating the skill 190 cannot provide a response to the user input. If the skill 190 associated with the highest post-NLU ranker score provides the post-NLU ranker 665 with result data 1030 indicating a response to the user input, the post-NLU ranker 665 (or another component of the supporting device(s) 120, such as the orchestrator component 230) may simply cause content corresponding to the result data 1030 to be output to the user. For example, the post-NLU ranker 665 may send the result data 1030 to the orchestrator component 230. The orchestrator component 230 may cause the result data 1030 to be sent to the user device 110, which may output audio and/or display text corresponding to the result data 1030. The orchestrator component 230 may send the result data 1030 to the ASR component 650 to generate output text data and/or may send the result data 1030 to the TTS system 680 to generate output audio data, depending on the situation.

The skill 190 associated with the highest post-NLU ranker score may provide the post-NLU ranker 665 with result data 1030 indicating more information is needed as well as instruction data. The instruction data may indicate how the skill 190 recommends the system obtain the needed information. For example, the instruction data may correspond to text data or audio data (i.e., computer-generated speech) corresponding to "please indicate ." The instruction data may be in a format (e.g., text data or audio data) capable of being output by the user device 110. When this occurs, the post-NLU ranker 665 may simply cause the received instruction data be output by the user device 110. Alternatively, the instruction data may be in a format that is not capable of being output by the user device 110. When this occurs, the post-NLU ranker 665 may cause the ASR component 650 or the TTS system 680 to process the instruction data, depending on the situation, to generate instruction data that may be output by the user device 110. Once the user provides the system with all further information needed by the skill 190, the skill 190 may provide the system with result data 1030 indicating a response to the user input, which may be output by the system as detailed above.

The system may include "informational" skills 190 that simply provide the system with information, which the system outputs to the user. The system may also include "transactional" skills 190 that require a system instruction to execute the user input. Transactional skills 190 include ride sharing skills, flight booking skills, etc. A transactional skill 190 may simply provide the post-NLU ranker 665 with result data 1030 indicating the transactional skill 190 can execute the user input. The post-NLU ranker 665 may then cause the system to solicit the user for an indication that the system is permitted to cause the transactional skill 190 to execute the user input. The user-provided indication may be an audible indication or a tactile indication (e.g., activation of a virtual button or input of text via a virtual keyboard). In response to receiving the user-provided indication, the system may provide the transactional skill 190 with data corresponding to the indication. In response, the transactional skill 190 may execute the command (e.g., book a flight, book a train ticket, etc.). Thus, while the system may not further engage an informational skill 190 after the informational skill 190 provides the post-NLU ranker 665 with result data 1030, the system may further engage a transactional skill 190 after the transactional skill 190 provides the post-NLU ranker 665 with result data 1030 indicating the transactional skill 190 may execute the user input.

In some instances, the post-NLU ranker 665 may generate respective scores for first and second skills that are too close (e.g., are not different by at least a threshold difference) for the post-NLU ranker 665 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 230, post-NLU ranker 665, shortlister 950, or other component may be trained and operated according to various machine learning techniques.

The user device 110 and/or the supporting device(s) 120 may include a user recognition component 695 that recognizes one or more users using a variety of data. User recognition data 1195 may be used to, for example, select secondary media content 115b for streaming to a user device 110. As illustrated in FIG. 11, the user recognition component 695 may include one or more subcomponents including a vision component 1108, an audio component 1110, a biometric component 1112, a radio frequency (RF) component 1114, a machine learning (ML) component 1116, and a recognition confidence component 1118. In some instances, the user recognition component 695 may monitor data and determinations from one or more subcomponents to determine an identity of one or more users associated with data input to the user device 110 and/or the supporting device(s) 120. The user recognition component 695 may output user recognition data 1195, which may include a user identifier associated with a user the user recognition component 695 determines originated data input to the user device 110 and/or the supporting device(s) 120. The user recognition data 1195 may be used to inform processes performed by various components of the user device 110 and/or the supporting device(s) 120.

The vision component 1108 may receive data from one or more sensors capable of providing images (e.g., cameras) or sensors indicating motion (e.g., motion sensors). The vision component 1108 can perform facial recognition or image analysis to determine an identity of a user and to associate that identity with a user profile associated with the user. In some instances, when a user is facing a camera, the vision component 1108 may perform facial recognition and identify the user with a high degree of confidence. In other instances, the vision component 1108 may have a low degree of confidence of an identity of a user, and the user recognition component 695 may utilize determinations from additional components to determine an identity of a user. The vision component 1108 can be used in conjunction with other components to determine an identity of a user. For example, the user recognition component 695 may use data from the vision component 1108 with data from the audio component 1110 to identify what user's face appears to be speaking at the same time audio is captured by a user device 110 the user is facing for purposes of identifying a user who spoke an input to the user device 110 and/or the supporting device(s) 120.

The overall system of the present disclosure may include biometric sensors that transmit data to the biometric component 1112. For example, the biometric component 1112 may receive data corresponding to fingerprints, iris or retina scans, thermal scans, weights of users, a size of a user, pressure (e.g., within floor sensors), etc., and may determine a biometric profile corresponding to a user. The biometric component 1112 may distinguish between a user and sound from a television, for example. Thus, the biometric component 1112 may incorporate biometric information into a confidence level for determining an identity of a user. Biometric information output by the biometric component 1112 can be associated with specific user profile data such that the biometric information uniquely identifies a user profile of a user.

The radio frequency (RF) component 1114 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1114 the strength of the signal (e.g., as a received signal strength indication (RSSI)). The RF component 1114 may use the RSSI to determine an identity of a user (with an associated confidence level). In some instances, the RF component 1114 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the user device 110. In this manner, the user may "register" with the system 600 for purposes of the system 600 determining who spoke a particular input. Such a registration may occur prior to, during, or after speaking of an input.

The ML component 1116 may track the behavior of various users as a factor in determining a confidence level of the identity of the user. By way of example, a user may adhere to a regular schedule such that the user is at a first location during the day (e.g., at work or at school). In this example, the ML component 1116 would factor in past behavior and/or trends in determining the identity of the user that provided input to the user device 110 and/or the supporting device(s) 120. Thus, the ML component 1116 may use historical data and/or usage patterns over time to increase or decrease a confidence level of an identity of a user.

In at least some instances, the recognition confidence component 1118 receives determinations from the various components 1108, 1110, 1112, 1114, and 1116, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1195.

The audio component 1110 may receive data from one or more sensors capable of providing an audio signal (e.g., one or more microphones 612) to facilitate recognition of a user. The audio component 1110 may perform audio recognition on an audio signal to determine an identity of the user and associated user identifier. In some instances, aspects of user device 110 and/or the supporting device(s) 120 may be configured at a computing device (e.g., a local server). Thus, in some instances, the audio component 1110 operating on a computing device may analyze all sound to facilitate recognition of a user. In some instances, the audio component 1110 may perform voice recognition to determine an identity of a user.

The audio component 1110 may also perform user identification based on audio data 631 input into the user device 110 and/or the supporting device(s) 120 for speech processing. The audio component 1110 may determine scores indicating whether speech in the audio data 631 originated from particular users. For example, a first score may indicate a likelihood that speech in the audio data 631 originated from a first user associated with a first user identifier, a second score may indicate a likelihood that speech in the audio data 631 originated from a second user associated with a second user identifier, etc. The audio component 1110 may perform user recognition by comparing speech characteristics represented in the audio data 631 to stored speech characteristics of users (e.g., stored voice profiles associated with the user device 110 that captured the spoken user input).

Figure 12:
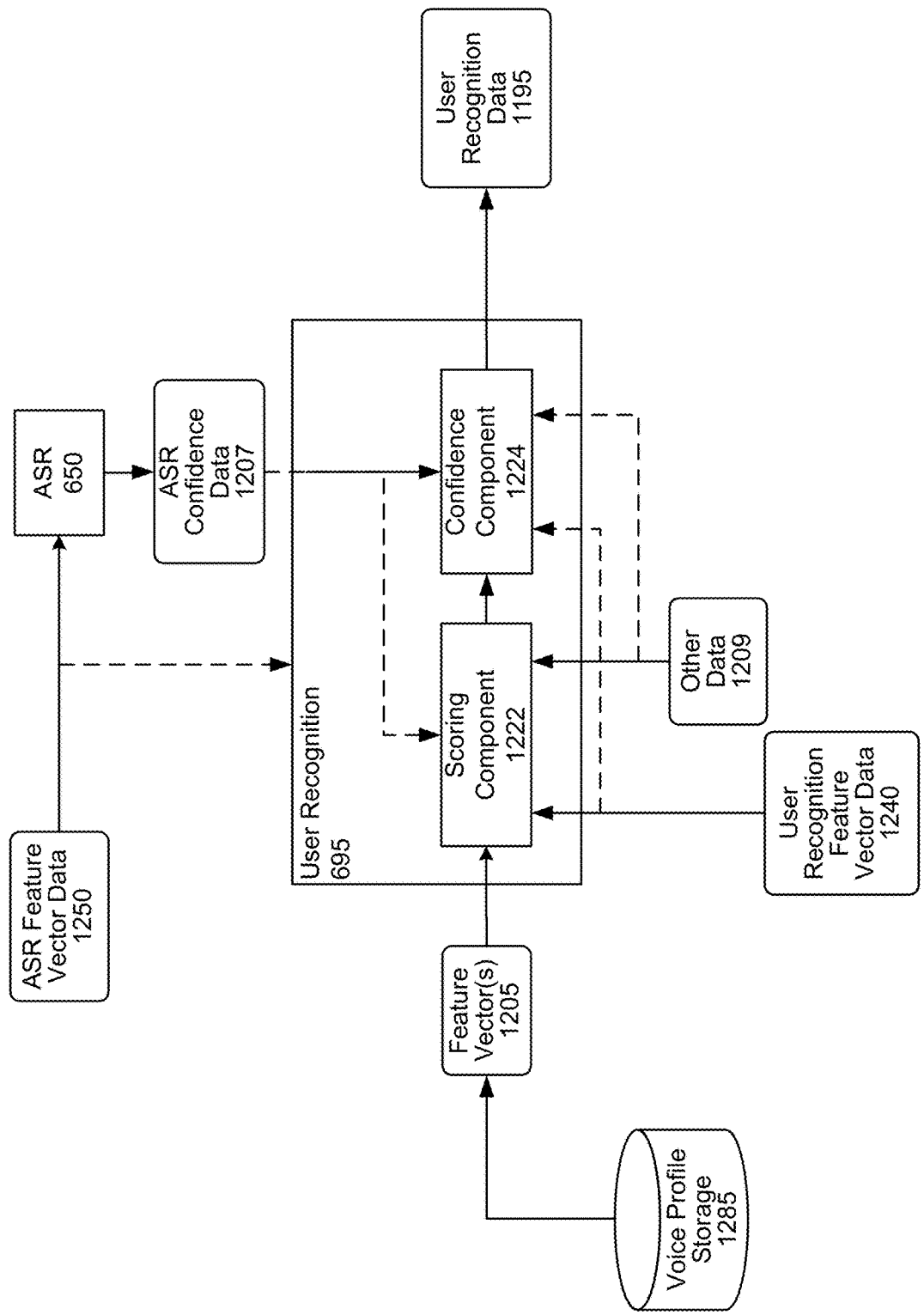
FIG. 12 is a system flow diagram illustrating user recognition according to embodiments of the present disclosure.

FIG. 12 illustrates user recognition processing as may be performed by the user recognition component 695. The ASR component 650 performs ASR processing on ASR feature vector data 1250. ASR confidence data 1207 may be passed to the user recognition component 695.

The user recognition component 695 performs user recognition using various data including the user recognition feature vector data 1240, feature vectors 1205 representing voice profiles of users of the system 600, the ASR confidence data 1207, and other data 1209. The user recognition component 695 may output the user recognition data 1195, which reflects a certain confidence that the user input was spoken by one or more particular users. The user recognition data 1195 may include one or more user identifiers (e.g., corresponding to one or more voice profiles). Each user identifier in the user recognition data 1195 may be associated with a respective confidence value, representing a likelihood that the user input corresponds to the user identifier. A confidence value may be a numeric or binned value.

The feature vector(s) 1205 input to the user recognition component 695 may correspond to one or more voice profiles. The user recognition component 695 may use the feature vector(s) 1205 to compare against the user recognition feature vector 1240, representing the present user input, to determine whether the user recognition feature vector 1240 corresponds to one or more of the feature vectors 1205 of the voice profiles. Each feature vector 1205 may be the same size as the user recognition feature vector 1240.

To perform user recognition, the user recognition component 695 may determine the user device 110 from which the audio data 631 originated. For example, the audio data 631 may be associated with metadata including a device identifier representing the user device 110. Either the user device 110 or the supporting device(s) 120 may generate the metadata. The system 600 may determine a group profile identifier associated with the device identifier, may determine user identifiers associated with the group profile identifier, and may include the group profile identifier and/or the user identifiers in the metadata. The system 600 may associate the metadata with the user recognition feature vector 1240 produced from the audio data 631. The user recognition component 695 may send a signal to voice profile storage 1285, with the signal requesting only audio data and/or feature vectors 1205 (depending on whether audio data and/or corresponding feature vectors are stored) associated with the device identifier, the group profile identifier, and/or the user identifiers represented in the metadata. This limits the universe of possible feature vectors 1205 the user recognition component 695 considers at runtime and thus decreases the amount of time to perform user recognition processing by decreasing the amount of feature vectors 1205 needed to be processed. Alternatively, the user recognition component 695 may access all (or some other subset of) the audio data and/or feature vectors 1205 available to the user recognition component 695. However, accessing all audio data and/or feature vectors 1205 will likely increase the amount of time needed to perform user recognition processing based on the magnitude of audio data and/or feature vectors 1205 to be processed.

If the user recognition component 695 receives audio data from the voice profile storage 1285, the user recognition component 695 may generate one or more feature vectors 1205 corresponding to the received audio data.

The user recognition component 695 may attempt to identify the user that spoke the speech represented in the audio data 631 by comparing the user recognition feature vector 1240 to the feature vector(s) 1205. The user recognition component 695 may include a scoring component 1222 that determines respective scores indicating whether the user input (represented by the user recognition feature vector 1240) was spoken by one or more particular users (represented by the feature vector(s) 1205). The user recognition component 695 may also include a confidence component 1224 that determines an overall accuracy of user recognition processing (such as those of the scoring component 1222) and/or an individual confidence value with respect to each user potentially identified by the scoring component 1222. The output from the scoring component 1222 may include a different confidence value for each received feature vector 1205. For example, the output may include a first confidence value for a first feature vector 1205*a* (representing a first voice profile), a second confidence value for a second feature vector 1205*b* (representing a second voice profile), etc. Although illustrated as two separate components, the scoring component 1222 and the confidence component 1224 may be combined into a single component or may be separated into more than two components.

The scoring component 1222 and the confidence component 1224 may implement one or more trained machine learning models (such as neural networks, classifiers, etc.) as known in the art. For example, the scoring component 1222 may use probabilistic linear discriminant analysis (PLDA) techniques. PLDA scoring determines how likely it is that the user recognition feature vector 1240 corresponds to a particular feature vector 1205. The PLDA scoring may generate a confidence value for each feature vector 1205 considered and may output a list of confidence values associated with respective user identifiers. The scoring component 1222 may also use other techniques, such as GMMs, generative Bayesian models, or the like, to determine confidence values.

The confidence component 1224 may input various data including information about the ASR confidence 1207, speech length (e.g., number of frames or other measured length of the user input), audio condition/quality data (such as signal-to-interference data or other metric data), fingerprint data, image data, or other factors to consider how confident the user recognition component 695 is with regard to the confidence values linking users to the user input. The confidence component 1224 may also consider the confidence values and associated identifiers output by the scoring component 1222. For example, the confidence component 1224 may determine that a lower ASR confidence 1207, or poor audio quality, or other factors, may result in a lower confidence of the user recognition component 695. Whereas a higher ASR confidence 1207, or better audio quality, or other factors, may result in a higher confidence of the user recognition component 695. Precise determination of the confidence may depend on configuration and training of the confidence component 1224 and the model(s) implemented thereby. The confidence component 1224 may operate using a number of different machine learning models/techniques such as GMM, neural networks, etc. For example, the confidence component 1224 may be a classifier configured to map a score output by the scoring component 1222 to a confidence value.

The user recognition component 695 may output user recognition data 1195 specific to a one or more user identifiers. For example, the user recognition component 695 may output user recognition data 1195 with respect to each received feature vector 1205. The user recognition data 1195 may include numeric confidence values (e.g., 0.0-1.0, 0-1000, or whatever scale the system is configured to operate). Thus, the user recognition data 1195 may output an n-best list of potential users with numeric confidence values (e.g., user identifier 123—0.2, user identifier 234—0.8).

Alternatively or in addition, the user recognition data 1195 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 695 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1195 may only include information related to the top scoring identifier as determined by the user recognition component 695. The user recognition component 695 may also output an overall confidence value that the individual confidence values are correct, where the overall confidence value indicates how confident the user recognition component 695 is in the output results. The confidence component 1224 may determine the overall confidence value.

The confidence component 1224 may determine differences between individual confidence values when determining the user recognition data 1195. For example, if a difference between a first confidence value and a second confidence value is large, and the first confidence value is above a threshold confidence value, then the user recognition component 695 is able to recognize a first user (associated with the feature vector 1205 associated with the first confidence value) as the user that spoke the user input with a higher confidence than if the difference between the confidence values were smaller.

The user recognition component 695 may perform thresholding to avoid incorrect user recognition data 1195 being output. For example, the user recognition component 695 may compare a confidence value output by the confidence component 1224 to a threshold confidence value. If the confidence value does not satisfy (e.g., does not meet or exceed) the threshold confidence value, the user recognition component 695 may not output user recognition data 1195, or may only include in that data 1195 an indicator that a user that spoke the user input could not be recognized. Further, the user recognition component 695 may not output user recognition data 1195 until enough user recognition feature vector data 1240 is accumulated and processed to verify a user above a threshold confidence value. Thus, the user recognition component 695 may wait until a sufficient threshold quantity of audio data of the user input has been processed before outputting user recognition data 1195. The quantity of received audio data may also be considered by the confidence component 1224.

The user recognition component 695 may be defaulted to output binned (e.g., low, medium, high) user recognition confidence values. However, such may be problematic in certain situations. For example, if the user recognition component 695 computes a single binned confidence value for multiple feature vectors 1205, the system may not be able to determine which particular user originated the user input. In this situation, the user recognition component 695 may override its default setting and output numeric confidence values. This enables the system to determine a user, associated with the highest numeric confidence value, originated the user input.

The user recognition component 695 may use other data 1209 to inform user recognition processing. A trained model(s) or other component of the user recognition component 695 may be trained to take other data 1209 as an input feature when performing user recognition processing. Other data 1209 may include a variety of data types depending on system configuration and may be made available from other sensors, devices, or storage. The other data 1209 may include a time of day at which the audio data 631 was generated by the user device 110 or received from the user device 110, a day of a week in which the audio data 631 was generated by the user device 110 or received from the user device 110, etc.

The other data 1209 may include image data or video data. For example, facial recognition may be performed on image data or video data received from the user device 110 from which the audio data 631 was received (or another device). Facial recognition may be performed by the user recognition component 695. The output of facial recognition processing may be used by the user recognition component 695. That is, facial recognition output data may be used in conjunction with the comparison of the user recognition feature vector 1240 and one or more feature vectors 1205 to perform more accurate user recognition processing.

The other data 1209 may include location data of the user device 110. The location data may be specific to a building within which the user device 110 is located. For example, if the user device 110 is located in user A's bedroom, such location may increase a user recognition confidence value associated with user A and/or decrease a user recognition confidence value associated with user B.

The other data 1209 may include data indicating a type of the user device 110. Different types of devices may include, for example, a smart watch, a smart phone, a tablet, and a vehicle. The type of the user device 110 may be indicated in a profile associated with the user device 110. For example, if the user device 110 from which the audio data 631 was received is a smart watch or vehicle belonging to a user A, the fact that the user device 110 belongs to user A may increase a user recognition confidence value associated with user A and/or decrease a user recognition confidence value associated with user B.

The other data 1209 may include geographic coordinate data associated with the user device 110. For example, a group profile associated with a vehicle may indicate multiple users (e.g., user A and user B). The vehicle may include a global positioning system (GPS) indicating latitude and longitude coordinates of the vehicle when the vehicle generated the audio data 631. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the user device 110 may indicate global coordinates and associated locations (e.g., work, home, etc.). One or more user profiles may also or alternatively indicate the global coordinates.

The other data 1209 may include data representing activity of a particular user that may be useful in performing user recognition processing. For example, a user may have recently entered a code to disable a home security alarm. A user device 110, represented in a group profile associated with the home, may have generated the audio data 631. The other data 1209 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the user device 110, this may be reflected in the other data 1209 and considered by the user recognition component 695.

Depending on system configuration, the other data 1209 may be configured to be included in the user recognition feature vector data 1240 so that all the data relating to the user input to be processed by the scoring component 1222 may be included in a single feature vector. Alternatively, the other data 1209 may be reflected in one or more different data structures to be processed by the scoring component 1222.

Figure 13:
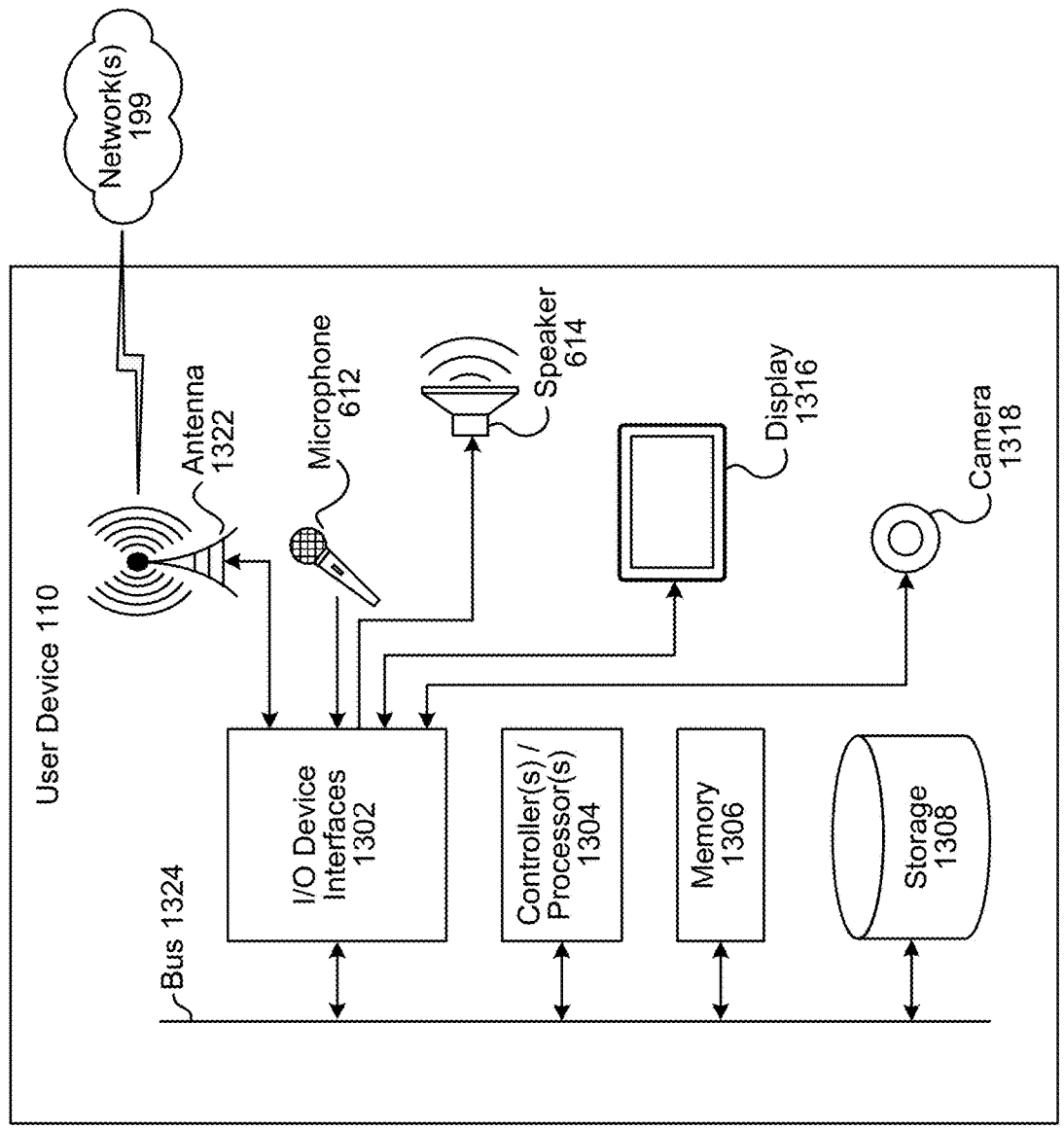
FIG. 13 is a block diagram conceptually illustrating example components of a device, according to embodiments of the present disclosure.
Figure 14:
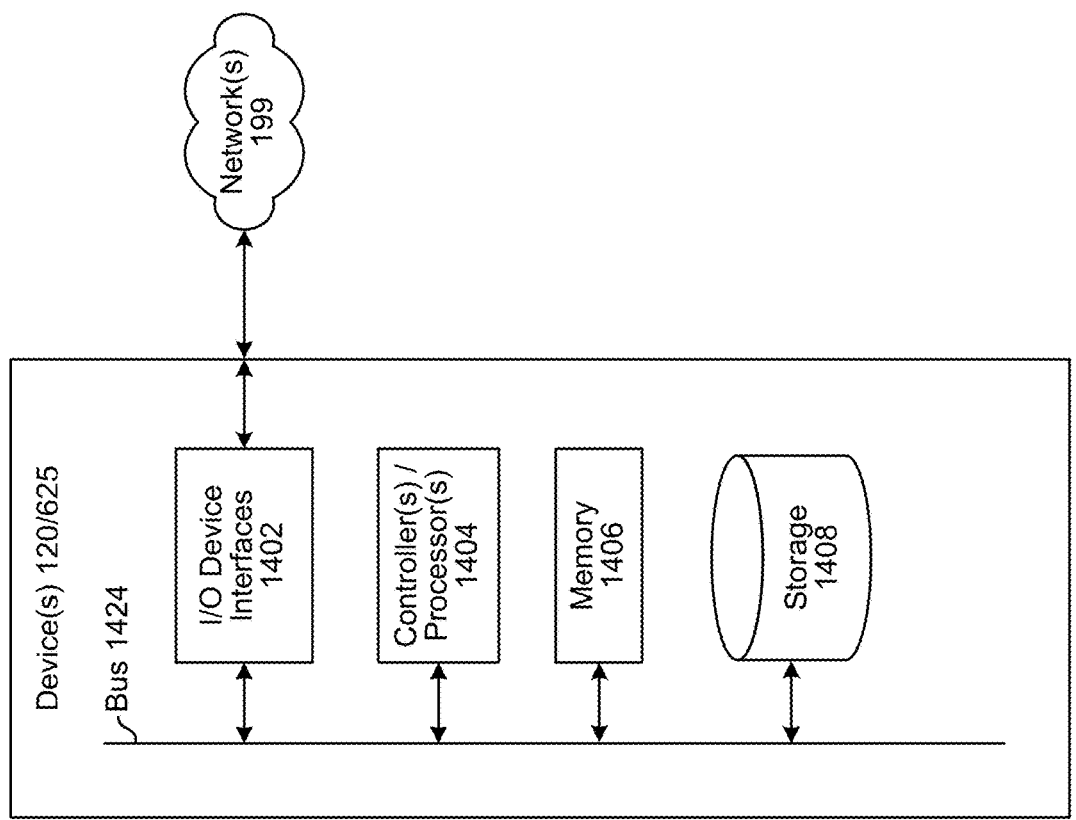
FIG. 14 is a block diagram conceptually illustrating example components of a system, according to embodiments of the present disclosure.

FIG. 13 is a block diagram conceptually illustrating a user device 110 that may be used with the system. FIG. 14 is a block diagram conceptually illustrating example components of a supporting device 120, which may assist with ASR processing, NLU processing, etc., and a skill support device 625. A device (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) he server/supporting device 120 may be located remotely from the user device 110 as its operations may not require proximity to the user. The server/supporting device 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). One benefit to the server/supporting device 120 being in a user's home/business is that data used to process a command/return a response may be kept within the user's home, thus reducing potential privacy concerns.

Multiple devices (120/625) may be included in the overall system 600 of the present disclosure, such as one or more supporting devices 120 for performing ASR processing, one or more supporting devices 120 for performing NLU processing, one or more skill support devices 625, etc. In operation, each of these systems may include computer-readable and computer-executable instructions that reside on the respective device (120/625), as will be discussed further below.

Each of these devices (110/120/625) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/625) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/625) may also be connected to removable or external non-volatile memory and/or storage (such as a removable memory card, memory key drive, networked storage, etc.) through respective input/output device interfaces (1302/1402).

Computer instructions for operating each device (110/120/625) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/625) includes input/output device interfaces (1302/1402). A variety of components may be connected through the input/output device interfaces (1302/1402), as will be discussed further below. Additionally, each device (110/120/625) may include an address/data bus (1324/1424) for conveying data among components of the respective device. Each component within a device (110/120/625) may also be directly connected to other components in addition to (or instead of) being connected to other components across the bus (1324/1424).

Referring to FIG. 13, the user device 110 may include input/output device interfaces 1302 that connect to a variety of components such as an audio output component such as a loudspeaker 614, a wired headset or a wireless headset (not illustrated), or other component capable of outputting audio. The user device 110 may also include an audio capture component. The audio capture component may be, for example, a microphone 612 or array of microphones 612, a wired headset or a wireless headset (not illustrated), etc. If an array of microphones 612 is included, approximate distance to a sound's point of origin may be determined by acoustic localization based on time and amplitude differences between sounds captured by different microphones 612 of the array. The user device 110 may additionally include a display 1316 for displaying content. The user device 110 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the supporting device 120, or a skill support device 625 may include their own dedicated processors, memory, and/or storage. Alternatively, one or more of the components of the device(s) 110, the supporting device 120, or a skill support device 625 may utilize the I/O interfaces (1302/1402), processor(s) (1304/1404), memory (1306/1406), and/or storage (1308/1408) of the device(s) 110, supporting device 120, or the skill support device 625, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the supporting device 120, and a skill support device 625, as described herein, are illustrative, and may be located as a stand-alone device or may be included, in whole or in part, as a component of a larger device or system. As can be appreciated, a number of components may exist either on a supporting device 120 and/or on user device 110; for example, the language processing components 692 (which may include ASR 650), the language output components 693 (which may include NLG 679 and TTS 180), etc., for example as illustrated in FIG. 6. Unless expressly noted otherwise, the system version of such components may operate similarly to the device version of such components and thus the description of one version (e.g., the system version or the local version) applies to the description of the other version (e.g., the local version or system version) and vice-versa.

Figure 15:
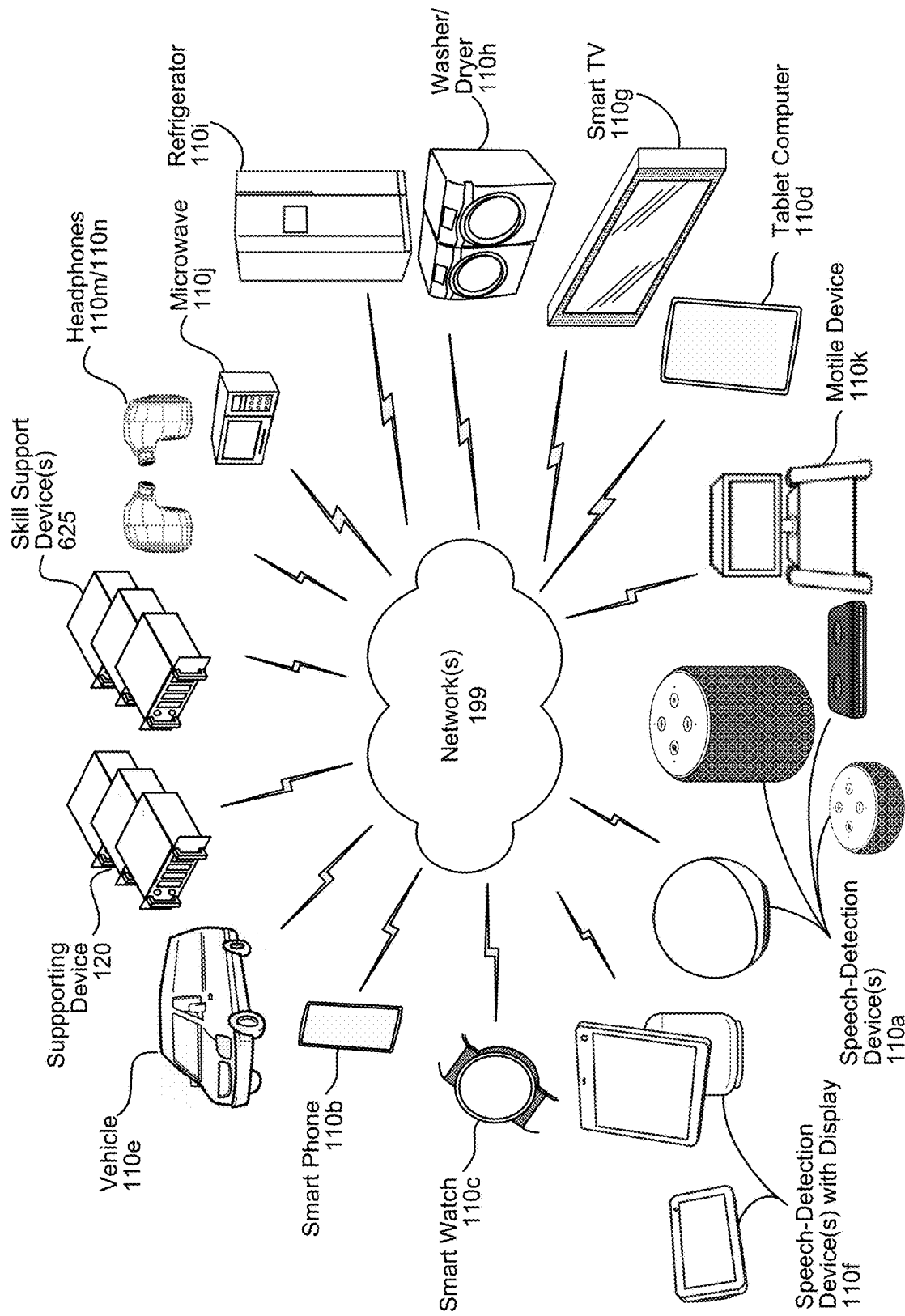
FIG. 15 illustrates an example of a computer network for use with the overall system, according to embodiments of the present disclosure.

As illustrated in FIG. 15, multiple devices (110a-110n, 120, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the supporting device 120, the skill support device(s) 625, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of the supporting device 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   sending, by a first device to a system component, a first request for first audio content;
   receiving, by the first device, a first directive to send metadata detected in audio data to the system component;
   receiving, in response to the first request, first audio data;
   storing the first audio data in a first buffer;
   queuing the first audio data in a second buffer for output;
   presenting a first output based on the first audio data queued in the second buffer;
   receiving second audio data for output in conjunction with the first audio data, the second audio data representing content independent of the first audio data;
   storing the second audio data in the first buffer;
   queuing the second audio data in the second buffer for output following presentation of the first output;
   detecting, based on queuing the second audio data, metadata representing a unique identifier corresponding to the second audio data;
   sending, to the system component, a first indication that the second audio data is queued for output, the first indication including the metadata;
   receiving, in response to the first indication, a second directive to output an image during a window of time corresponding output of the second audio data;
   presenting a second output based on the second audio data queued in the second buffer; and
   presenting, on a display, the image during the window of time.

2. The computer-implemented method of claim 1, further comprising:
   determining a first time at which the second audio data is queued in the second buffer, the first indication including the first time;
   generating, in response to receiving the second directive, a document representing a visual layout of the display, the document including logic specifying a second time at which to begin presenting the image and a third time at which to cease presenting the image;
   presenting, at the second time, the image, the second time following the first time by an offset corresponding to an estimated interval of time between queuing the second audio data in the second buffer and presenting the second output; and
   ceasing presentation of the image at the third time.

3. A computer-implemented method comprising:
   receiving, by a first device from a system component, a first directive to send metadata detected in media data by the first device to the system component;
   receiving media data for presentation by the first device;
   presenting a first output based on a first portion of the media data;
   queuing a second portion of the media data in a buffer for output following presentation of the first portion;
   detecting, based on queuing the second portion, metadata representing a unique identifier corresponding to the second portion;
   sending, to the system component, a first indication including the metadata;
   receiving, in response to the first indication, a second directive to perform an action associated with the second portion during a window of time corresponding to output of the second portion;
   presenting a second output based on the second portion queued in the buffer; and
   performing the action during the window of time.

4. The computer-implemented method of claim 3, further comprising:
   determining a first time at which the second portion is queued in the buffer, the first indication including the first time; and
   generating, in response to receiving the second directive, a document representing a visual layout of a display, the document including logic specifying a second time at which to begin presenting an image and a third time at which to cease presenting the image, wherein performing the action includes:
  presenting, at the second time, the image, the second time following the first time by an offset corresponding to an estimated interval of time between queuing the second portion in the buffer and presenting the second output; and
  ceasing output of the image at the third time.

5. The computer-implemented method of claim 3, wherein performing the action includes presenting an image indicated by the second directive, the method further comprising:
  receiving, in response to the first indication, a uniform resource locator (URL);
  associating the URL with the image;
  detecting a selection of the image; and
  in response to detecting the selection, retrieving, using the URL, data representing additional content related to the second portion.

6. The computer-implemented method of claim 3, further comprising:
  detecting a first instance of the metadata at a beginning of the second portion, wherein detecting the metadata includes detecting the first instance;
  detecting a second instance of the metadata at an end of the second portion; and
  in response to detecting the second instance:
    sending a second indication to the system component that output of the second portion has completed, and
    ceasing performance of the action.

7. The computer-implemented method of claim 3, further comprising:
  detecting, by the first device, an audio signal inaudible to a human in the second portion; and
  decoding the audio signal to determine the unique identifier.

8. The computer-implemented method of claim 3, wherein the metadata includes the unique identifier appended to the second portion of the media data.

9. The computer-implemented method of claim 3, further comprising:
  receiving audio data representing an utterance;
  determining that the audio data was received during presentation of the second output;
  in response to determining that the audio data was received during presentation of the second output, identifying language processing data associated with the second portion; and
  performing an action using the language processing data.

10. The computer-implemented method of claim 3, further comprising:
  sending, to the system component, a request for the media data; and
  in response to sending the request, receiving first data representing an ordered list of identifiers corresponding to portions of media content to be played sequentially, the first data including a first identifier corresponding to the first portion and a second identifier corresponding to the second portion.

11. The computer-implemented method of claim 10, further comprising:
  sending, using the first identifier, a first request to receive the first portion, wherein the first portion is received in response to the first request;
  after sending the first request and using the second identifier, sending a second request to receive the second portion, wherein the second portion is received in response to the second request; and
  queuing the second portion in the buffer until presentation of the first output has completed.

12. A system, comprising:
  at least one processor; and
  at least one memory comprising instructions that, when executed by the at least one processor, cause the system to:
    receive, by a first device from a second device, a first directive to send metadata detected in media data by the first device to the second device;
    receive media data for presentation by the first device;
    present a first output based on a first portion of the media data;
    queue a second portion of the media data in a buffer for output following presentation of the first portion;
    detect, based on queuing the second portion, metadata representing a unique identifier corresponding to the second portion;
    send, to the second device, a first indication including the metadata;
    receive, in response to the first indication, a second directive to perform an action associated with the second portion during a window of time corresponding to output of the second portion;
    present a second output based on the second portion queued in the buffer; and
    perform an action during the window of time.

13. The system of claim 12, wherein the at least one memory further includes instructions that, when executed by the at least one processor, further cause the system to:
  determine a first time at which the second portion is queued in the buffer, the first indication including the first time;
  generate, in response to receiving the second directive, a document representing a visual layout of a display, the document including logic specifying a second time at which to begin presenting an image and a third time at which to cease presenting the image;
  present, at the second time, the image, the second time following the first time by an offset corresponding to an estimated interval of time between queuing the second portion in the buffer and presenting the second output; and
  cease output of the image at the third time.

14. The system of claim 12, wherein performing the action includes presenting an image indicated by the second directive, and the at least one memory further includes instructions that, when executed by the at least one processor, further cause the system to:
  receive, in response to the first indication, a uniform resource locator (URL);
  associate the URL with the image;
  detecting a selection of the image; and
  in response to detection of the selection, retrieving, using the URL, data representing additional content related to the second portion.

15. The system of claim 12, wherein the at least one memory further includes instructions that, when executed by the at least one processor, further cause the system to:
  detect a first instance of the metadata at a beginning of the second portion, wherein detecting the metadata includes detecting the first instance;
  detect a second instance of the metadata at an end of the second portion; and
  in response to detection of the second instance:

send a second indication to the second device that output of the second portion has completed, and cease performance of the action.

16. The system of claim 12, wherein the at least one memory further includes instructions that, when executed by the at least one processor, further cause the system to:
detect, by the first device, an audio signal inaudible to a human in the second portion; and
decode the audio signal to determine the unique identifier.

17. The system of claim 12, wherein the metadata includes the unique identifier appended to the second portion of the media data.

18. The system of claim 12, wherein the at least one memory further includes instructions that, when executed by the at least one processor, further cause the system to:
receive audio data representing an utterance;
determine that the audio data was received during presentation of the second output;
in response to determination that the audio data was received during presentation of the second output, identify language processing data associated with the second portion; and
perform an action using the language processing data.

19. The system of claim 12, wherein the at least one memory further includes instructions that, when executed by the at least one processor, further cause the system to:
send, to the second device, a request for the media data; and
in response to sending the request, receive first data representing an ordered list of identifiers corresponding to portions of media content to be played sequentially, the first data including a first identifier corresponding to the first portion and a second identifier corresponding to the second portion.

20. The system of claim 19, wherein the at least one memory further includes instructions that, when executed by the at least one processor, further cause the system to:
send, using the first identifier, a first request to receive the first portion, wherein the first portion is received in response to the first request;
after sending the first request and using the second identifier, send a second request to receive the second portion, wherein the second portion is received in response to the second request; and
queue the second portion in the buffer until presentation of the first output has completed.

* * * * *